(12) United States Patent
Medica et al.

(10) Patent No.: US 8,711,552 B2
(45) Date of Patent: Apr. 29, 2014

(54) MODULAR SYSTEM HAVING EXPANDABLE FORM FACTOR

(75) Inventors: John Medica, Taipei (TW); Leonard Tsai, Taipei (TW); Shikuan Chen, Taipei (TW)

(73) Assignee: Compal Electronics Inc., Taipei (TW)

( * ) Notice: Subject to any disclaimer, the term of this patent is extended or adjusted under 35 U.S.C. 154(b) by 181 days.

(21) Appl. No.: 13/186,397

(22) Filed: Jul. 19, 2011

(65) Prior Publication Data

US 2012/0087078 A1 Apr. 12, 2012

Related U.S. Application Data

(60) Provisional application No. 61/404,696, filed on Oct. 6, 2010, provisional application No. 61/458,701, filed on Nov. 29, 2010, provisional application No. 61/467,378, filed on Mar. 24, 2011.

(51) Int. Cl.
*G06F 1/16* (2006.01)

(52) U.S. Cl.
USPC .................. 361/679.02; 705/400; 455/414.2; 345/473

(58) Field of Classification Search
USPC ........ 705/10, 14.1, 319, 7.29, 59, 14.66, 400;
361/679.01, 679.55, 679.21, 679.4,
361/679.08, 679.47, 679.58, 679.48,
361/679.45, 679.32, 679.53, 679.27,
361/679.09, 679.28, 679.11, 679.56;
455/41.1, 456.3, 435.1, 414.2, 566,
455/575.3, 556.1, 575.4, 569.1, 575.1;
345/473, 169, 419, 173; 439/220, 489,
439/345, 326
See application file for complete search history.

(56) References Cited

U.S. PATENT DOCUMENTS

| | | | |
|---|---|---|---|
| 5,768,163 | A | 6/1998 | Smith, II |
| 5,793,957 | A | 8/1998 | Kikinis et al. |
| 5,983,073 | A | 11/1999 | Ditzik |
| 6,538,880 | B1 | 3/2003 | Kamijo et al. |
| 6,654,842 | B1 | 11/2003 | Park |
| 6,735,663 | B2 | 5/2004 | Watts, Jr. et al. |
| 6,779,068 | B2 | 8/2004 | Kim |
| 6,798,647 | B2 | 9/2004 | Dickie |
| 6,816,925 | B2 | 11/2004 | Watts, Jr. |
| 6,978,010 | B1 | 12/2005 | Short et al. |
| 7,010,634 | B2 | 3/2006 | Silvester |

(Continued)

FOREIGN PATENT DOCUMENTS

| | | |
|---|---|---|
| CN | 101661313 | 3/2010 |
| JP | 2004-334865 | 11/2004 |

(Continued)

*Primary Examiner* — Hung Duong
(74) *Attorney, Agent, or Firm* — Liu & Liu

(57) ABSTRACT

A modular system of devices, in which a (master) device can be combined with one or more of other (slave) devices to transform to functional electronic devices having expanded functionalities and features in different form factors and/or platforms. The master device is docked to the slave device via a data/electrical interface, to transform the master device to the larger form factor of the slave device, with the master device maintaining control of the slave device, substantially based on the operating system installed in the master device, with access to the data, application programs, functionalities and features embodied in the master device. An intermediate removable physical interface adaptor (or docking adaptor) is provided to facilitate docking compatibility of the master device to the slave device. An enhanced charging and power management scheme is provided to optimize power management for the master device and the slave device.

24 Claims, 33 Drawing Sheets

(56) References Cited

U.S. PATENT DOCUMENTS

| | | |
|---|---|---|
| 7,014,484 B2 * | 3/2006 | Hagiwara .................... 439/159 |
| 7,054,965 B2 | 5/2006 | Bell et al. |
| 7,149,837 B2 | 12/2006 | Watts, Jr. et al. |
| 7,152,125 B2 | 12/2006 | Garney et al. |
| 7,253,586 B2 | 8/2007 | Kangas et al. |
| 7,254,015 B2 * | 8/2007 | Yin et al. ................ 361/679.55 |
| 7,266,774 B2 | 9/2007 | Jones |
| 7,342,571 B2 | 3/2008 | Fraser et al. |
| 7,587,717 B2 | 9/2009 | Garney et al. |
| 7,966,578 B2 | 6/2011 | Tolmasky et al. |
| 8,405,978 B2 * | 3/2013 | Okutsu .................... 361/679.55 |
| 2003/0126335 A1 | 7/2003 | Silvester |
| 2005/0185364 A1 | 8/2005 | Bell et al. |
| 2007/0077784 A1 | 4/2007 | Kalayjian et al. |
| 2007/0182663 A1 | 8/2007 | Biech |
| 2008/0144051 A1 | 6/2008 | Voltz et al. |
| 2008/0266783 A1 | 10/2008 | Mills et al. |
| 2008/0273297 A1 | 11/2008 | Kumar |
| 2009/0012841 A1 * | 1/2009 | Saft et al. ..................... 705/10 |
| 2009/0198852 A1 | 8/2009 | Rofougaran |
| 2009/0213032 A1 | 8/2009 | Newport et al. |
| 2010/0060549 A1 | 3/2010 | Tsern |
| 2010/0060572 A1 | 3/2010 | Tsern |
| 2010/0064228 A1 | 3/2010 | Tsern |
| 2010/0318709 A1 | 12/2010 | Bell et al. |
| 2013/0077212 A1 * | 3/2013 | Nakajima ................ 361/679.01 |

FOREIGN PATENT DOCUMENTS

| | | |
|---|---|---|
| JP | 2004-341514 | 12/2004 |
| JP | 2007-272341 | 10/2007 |
| KR | 10-2006-0103562 | 10/2006 |
| WO | 2008/099384 | 8/2008 |
| WO | 2010110962 | 9/2010 |

* cited by examiner

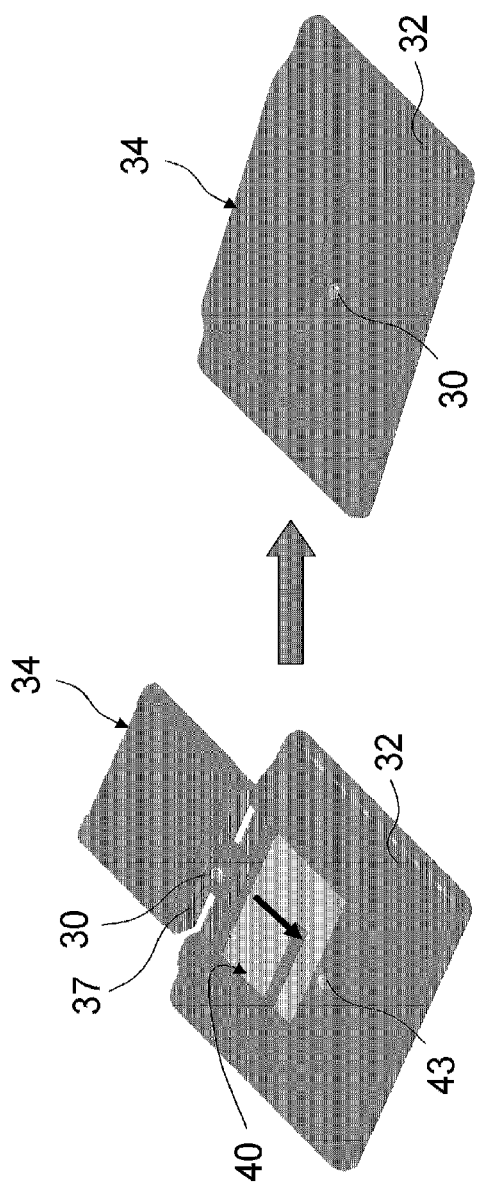
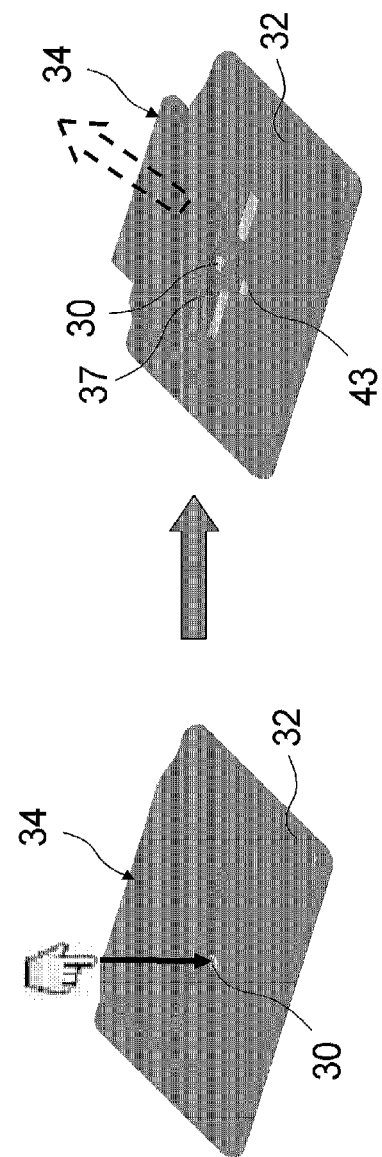
FIG. 7A
FIG. 7B

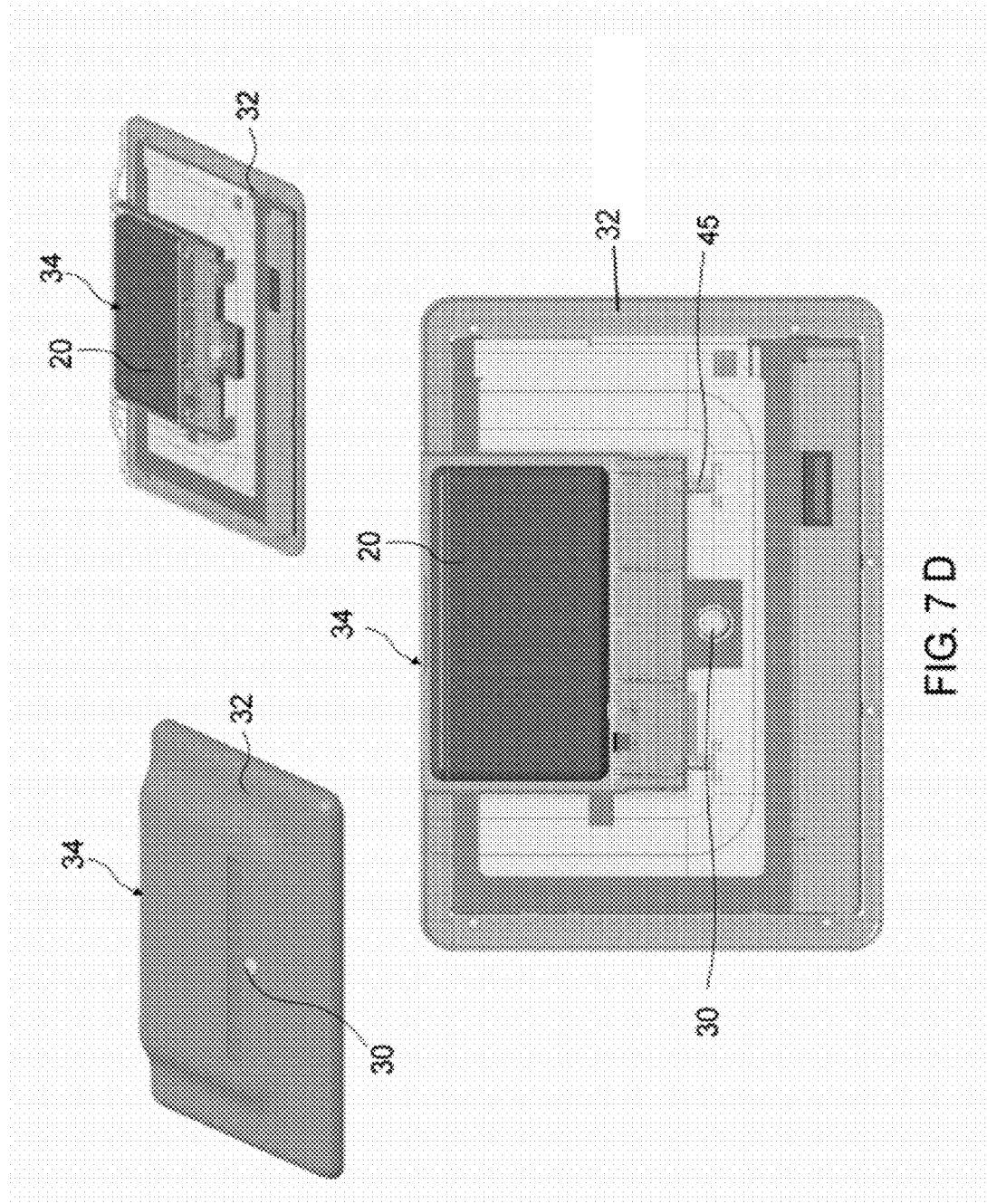

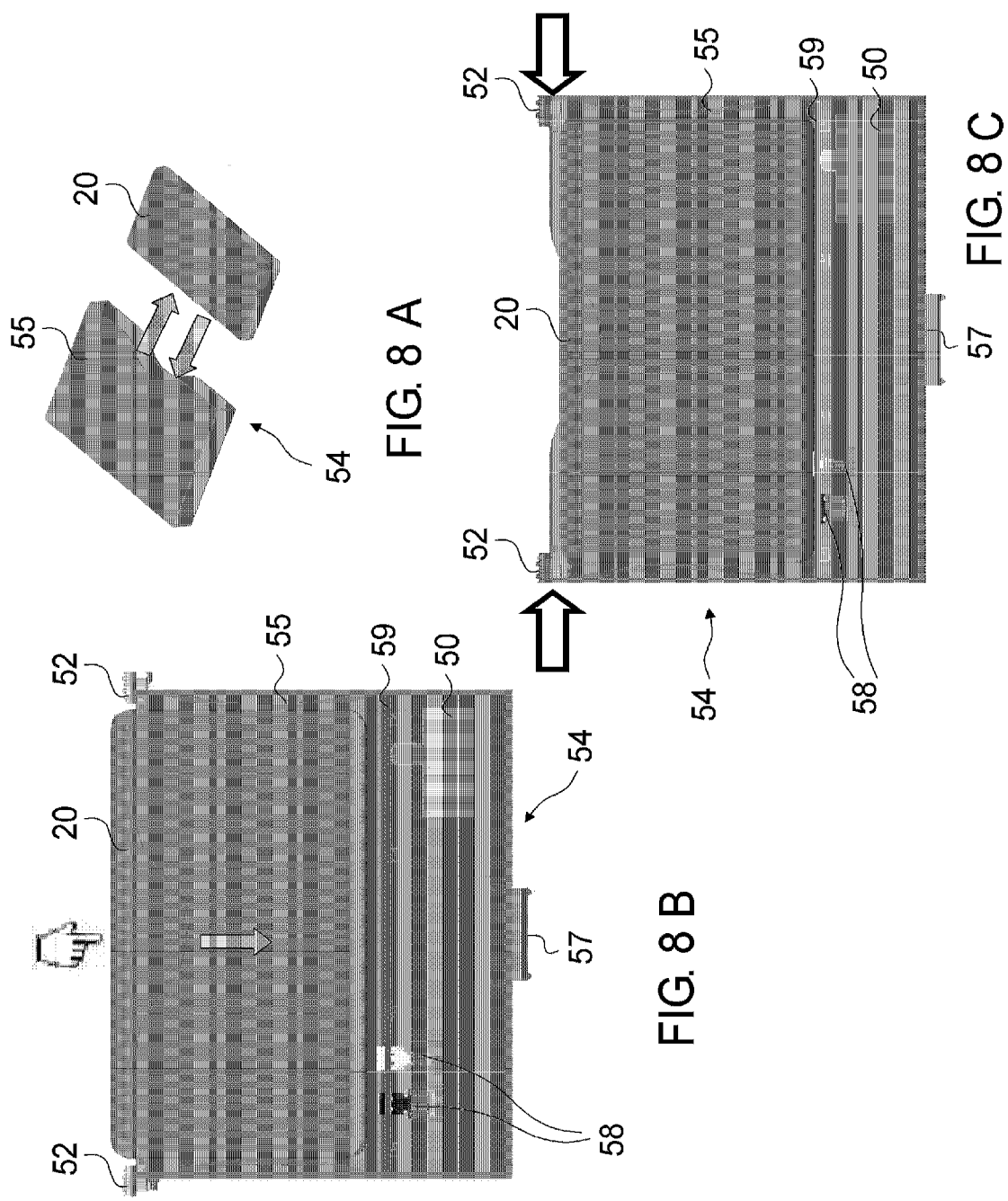

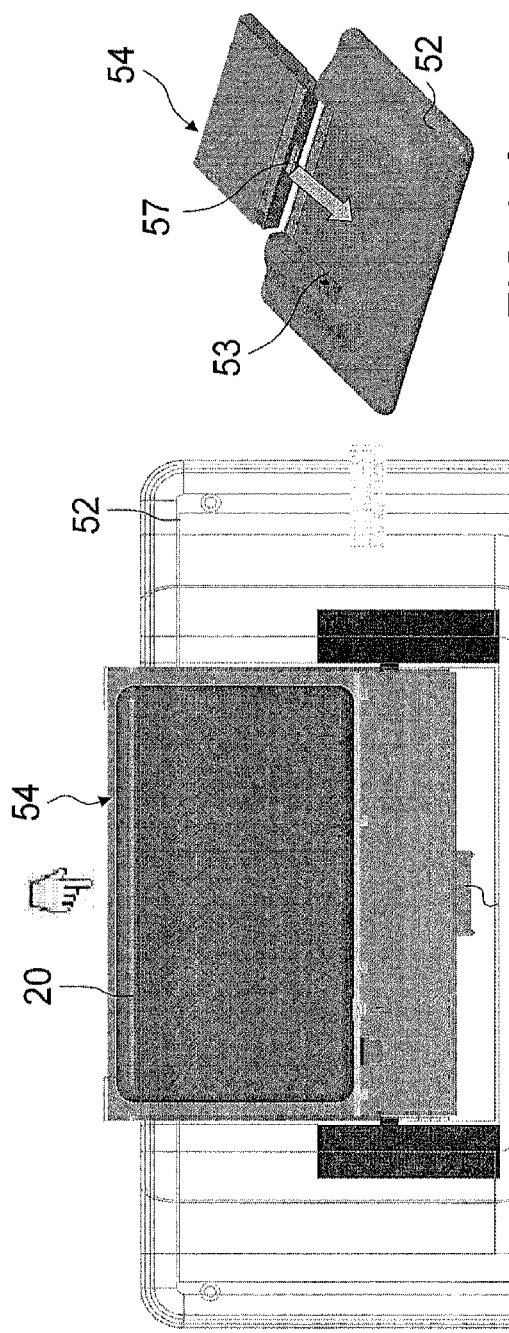
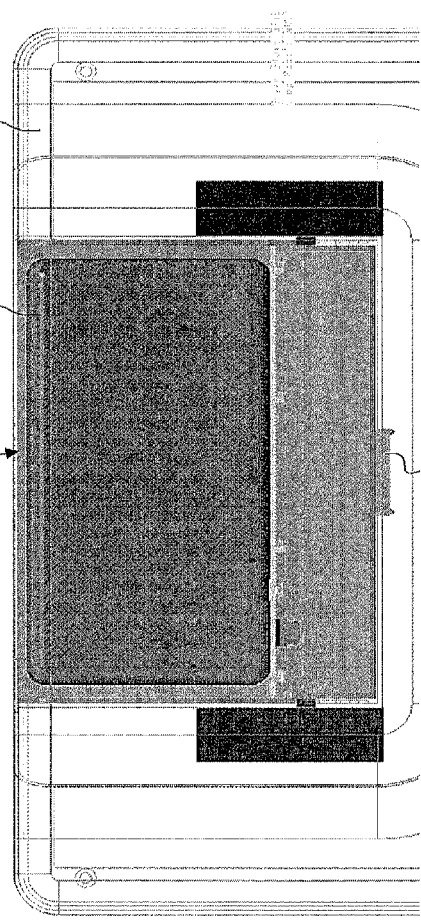
FIG. 9A
FIG. 9B
FIG. 9C

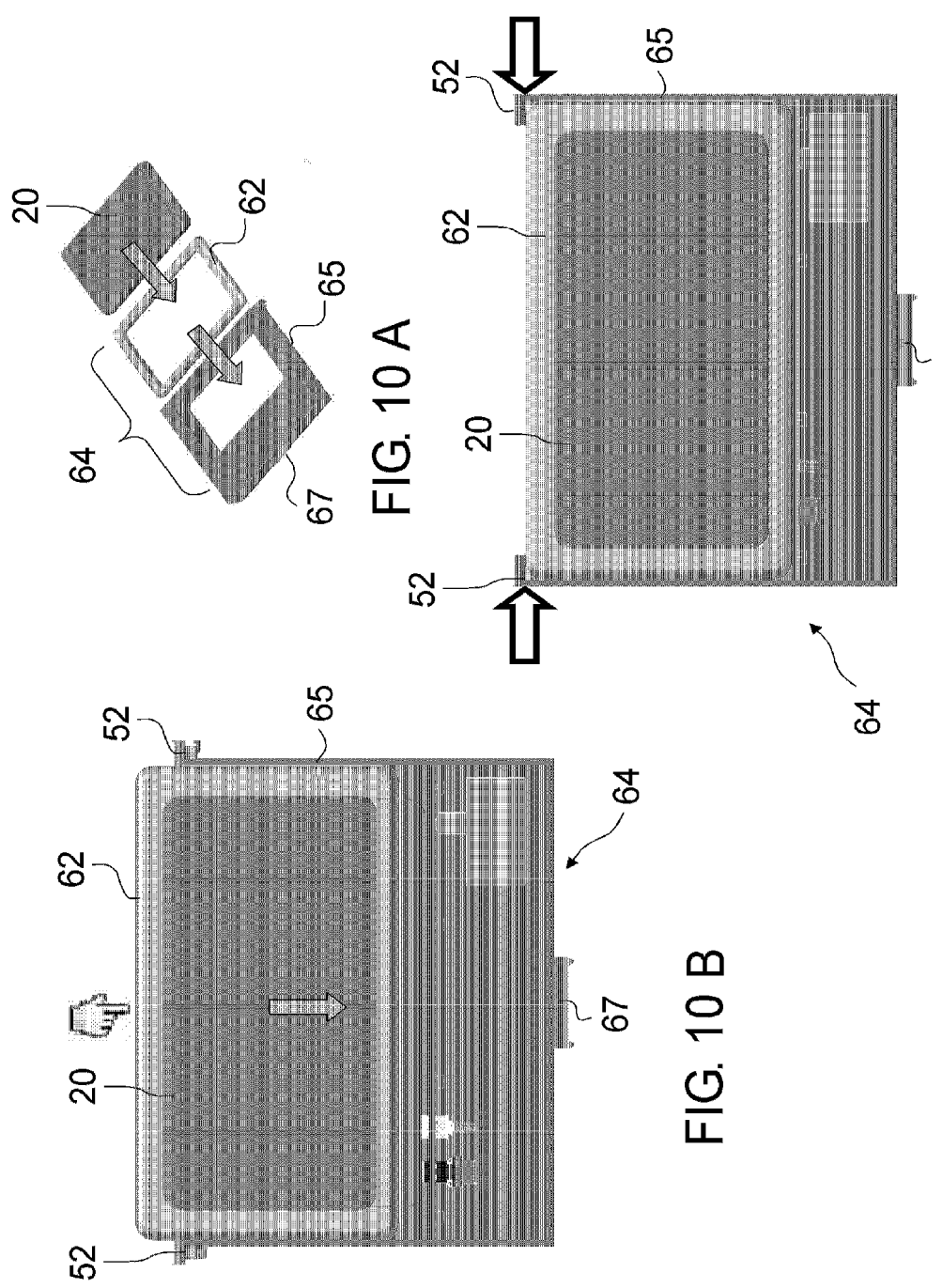

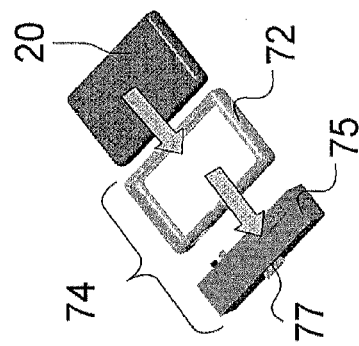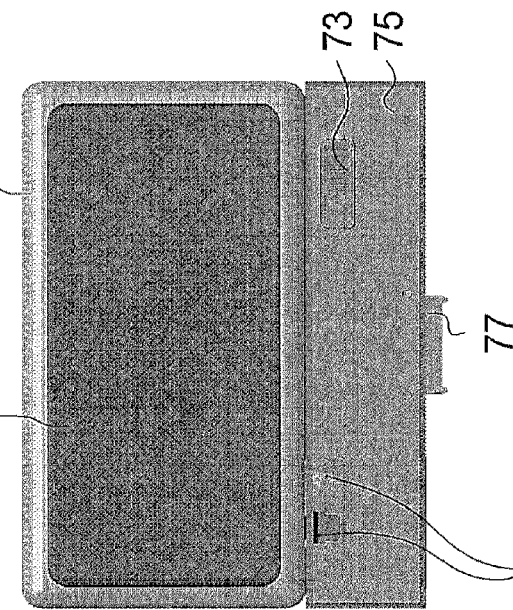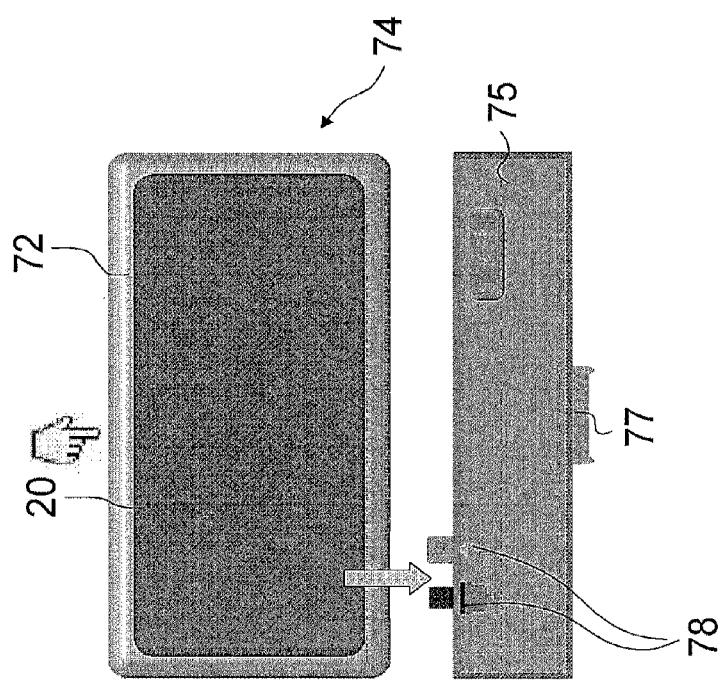
FIG. 11 A
FIG. 11 C
FIG. 11 B

MODULAR SYSTEM HAVING EXPANDABLE FORM FACTOR

CROSS REFERENCE

This application claims the priority of (a) U.S. Provisional Patent Application No. 61/404,696, filed on Oct. 6, 2010; (b) U.S. Provisional Patent Application No. 61/458,701, filed on Nov. 29, 2010; and (c) U.S. Provisional Patent Application No. 61/467,378, filed on Mar. 24, 2011; which are fully incorporated by reference as if fully set forth herein.

BACKGROUND OF THE INVENTION

1. Field of the Invention

The present invention is directed to a modular system of devices, in which a master device can be combined with one or more of the other devices in the system to expand functionalities and features in different form factors and/or platforms.

2. Description of Related Art

The evolution of portable personal electronic devices changed the life of consumers. For example, notebook computers, cellular phones, etc., provided utility and convenience to consumers which are not possible just 20 years ago. Some of the smaller portable electronic devices are developed with features and functionalities that rival comparably larger devices. For example, smartphones are now provided with sufficient processing power that can run applications that were available in larger notebook computers.

Heretofore, handheld personal electronic devices have been developed in various form factors, each designed to optimize certain application utilities to users. For example, smartphones (e.g., Apple iPhone) have smaller form factors, as compared to tablet computers (e.g., Apple iPad). Smartphones are primarily used for telecommunication, which also provide access to the Internet, and run entertainment and productivity applications. Tablets, which have larger and higher resolution display screens as compared to smart phones but which are lighter in weight than notebook computers, are primarily used as a consumer tool, for providing access to the Internet, run entertainment and productivity applications, and in some models, also providing telecommunication function. Tablets require larger batteries in order to support relatively higher power consumptions by the larger displays and other power consuming devices within the larger form factor of the tablets.

As can be appreciated, there are significant overlap of hardware and software functionalities and features between smartphones and tablets. With the development of increasingly more powerful and feature packed smartphones, the capabilities (e.g., processing power) of smartphones are comparable with the larger tablet computers and notebook computers, with the screen size and resolution and battery size being the significant differences between the devices of different form factors. For a user who wishes to have the convenience of a smartphone for telecommunication but also the enhanced display of a tablet, the user must purchase both devices, despite the redundant functions and features of the devices of different form factors. To ensure full functionality that the user is accustomed to when the user switches between devices, similar applications must be loaded in both devices. Further, certain data (e.g., personal data) entered in one device must be exchanged or synchronized with the other device, to make similar data available to the user when the user switches between devices. Heretofore, data synchronization applications are not robust enough to provide seamless, error free data synchronization.

U.S. Pat. No. 7,010,634 assigned to Intel is entitled "NOTEBOOK COMPUTER WITH INDEPENDENTLY FUNCTIONAL DOCKABLE CORE COMPUTER". According to its abstract, a notebook computer includes a docking port to receive a core computer. The processor of the core computer serves as the system processor for the notebook computer when the core computer is docked in the notebook computer. When the core computer is undocked, the processor serves as the system processor for the core computer. The core computer may boot a mini operating system when undocked, whereas the notebook computer may boot a full operating system when the core computer is docked. The processor of the core computer may operate at a lower voltage and at a lower frequency when serving as the system processor for the core computer than when serving as the system processor for the notebook computer. When the core computer is docked, the notebook computer memory is synchronized with the core computer memory, and a battery in the core computer is charged.

While the system disclosed in U.S. Pat. No. 7,010,634 reduced certain hardware redundancy between the notebook computer and the core computer (namely sharing a single system processor), it nevertheless relies to a large extent, running separate operating systems and application programs residing in the different devices, and data synchronization between the different devices. For example, when the core computer is docked in the notebook computer, the system processor boots a larger, full operating system installed in the larger notebook computer to run the application programs installed (i.e., uniquely associated with the full operating system) in the larger notebook computer. When undocked, the system processor boots a smaller, mini operating system installed in the core computer to run the application programs installed (i.e., uniquely associated with the mini operating system) in the smaller core computer. Given the booting of different operating systems in the different devices, the docking and undocking of the core computer with respect to the notebook computer require re-initiation of operating system (which requires power down), hence not in a "hot swap" manner.

It is therefore desirable to develop a dockable system of electronic device that can more significantly reduce the redundancies between devices, in hardware, software as well as data, while providing ease of docking and versatility of use between form factors and/or across platforms.

SUMMARY OF THE INVENTION

The present invention provides a modular system of devices, in which a (master) device can be combined with one or more of the other (slave) devices in the system to transform to functional electronic devices (e.g., handheld cellular phone, tablet computing device, notebook PC device, netbook device, etc.) having expanded functionalities and features in expanded form factors and/or different platforms. The modular system reduces redundancy among the components of the various devices in the system, and instead improves operability with optimized and/or enhanced functionalities and features, as the master device transforms to a larger form factor and/or a different platform by combining with a slave device. When the master device transformed from one form factor and/or platform into another by combining with one or more slave devices, the master device provides control and/or stored data to operate the slave devices. The master device and slave devices share certain control, hardware, software and data, to reduce redundancy between devices of various form factors and/or platform, in a manner that provides additional or different functions and features in an optimized and/or enhanced manner as the form factor and/or platform changes from one to another. The master device is docked to different slave devices via a physical port or interface and a data/electrical port or interface, to complete different functional electronic devices of different form factors and/or platform, to achieve enhanced functionalities or a different set of functionalities.

In one aspect of the present invention, when undocked, the master device is independently functional with its own set of features. For example, a smart phone has its own operating system (O/S), a system processor (e.g., a central processing unit (CPU), which is a general purpose processor, or a multi-function processor, which controls the various aspects of th system), a basic input/output system (BIOS) (which may be part of the system processor), memory (e.g., flash memory, RAM, solid state drive, etc.), display, keyboard, microphone, speakers, associated analog and digital circuitry, battery, etc. In one embodiment, the slave device is a dumb base device with limited features and functionalities, without any or any significant processing power of its own, and having different I/O specification (e.g., graphics resolution, audio, etc.). For example, a tablet-like slave device has memory (e.g., flash memory, RAM, solid state drive, etc.), display, keyboard, microphone, speakers, associate analog and digital circuitry, battery, etc., but no system processor. When the master device is docked to the larger slave device, the master device's system processor and operating system are used to run the slave device, and further the application programs residing in the master device, in the physical peripheral environment provided by the slave device (e.g., enhanced display). Additional application software may be installed in the slave device, which the master device system processor can run as well.

In one embodiment, the slave device may have limited processing power or limited co-processing power (i.e., not general purpose processor or multi-function processor) as compared to the processing power of the system processor that runs the operating system in the master device. Such limited, specific processing may be required for operations of specific peripherals in the larger slave device, such as I/O drivers, graphics drivers, human interface devices, etc, or other limited operation control functions for the peripheral components uniquely associated with the particular slave device (e.g., in the case of the slave device being an image projector device, the slave device may have limited processing control of the projection mechanism and power management). For example, the slave device may have its own application specific integrated circuit (ASIC) hard-coded with routines to undertake the limited, specific tasks, which do not correspond to an operating system, and in particular the operating system installed in the master device. Notwithstanding, the operating system in the master device provides significantly more functionality than any limited device operation control related routines that may be provided in the slave device, and the system processor in the master device provides significantly higher processing power than any processor provided in the slave device.

Different slave devices may be designed and configured with an appropriate set of peripheral components (e.g., display, microphone, speakers, antenna, etc.) optimized for specific applications when used in conjunction with the master device. For certain applications, given the high level of physical integration of components within a physical unit to optimize form factor, and the desire to optimize performance specific to a particular application, the master and slave devices may have some level of redundancy (e.g., the master device and the slave device may have different types of displays, speakers, microphones, etc. optimized for the respective applications of the master and slave devices).

The master device is docked to the slave device via a physical port or interface and a data/electrical port or interface, to transform the master device to the larger form factor of the slave device, with the master device maintaining control of the slave device, substantially based on the operating system installed in the master device, with access to the data, application programs, functionalities and features embodied in the master device.

In another aspect of the present invention, an intermediate, portable, removable physical interface adaptor (or docking adaptor) is provided to facilitate docking of the master device to the slave device. Given various master devices have external housings of different physical shapes and sizes, in order to provide compatibility of different master devices for docking to the same slave device, different adaptors are provided for different master devices. Different physical interface adaptors can be configured to fit different master devices for a particular same slave device. A particular portable physical interface adaptor conforms to the form factor of a particular master device and conforms to a docking bay provided in a particular slave device housing, such that the master device can be docked to the slave device housing. The physical interface adaptor comprises a first structure that conforms to at least a part of the master device housing, and a second structure that conforms to the docking bay in the slave device, such that at least a part of the master device housing can fit into the first structure and the second structure can fit into the docking bay in the slave device housing, so that the master device can be docked into the housing of the slave device. The physical interface adaptor supports an electrical port or adaptor to provide data and power connections between an electrical port on the master device and a docking interface on the slave device.

In one embodiment, the master device is substantially contained in the slave device upon docking.

In one embodiment, the physical interface adaptor is configured in the form of a cartridge, having a case that substantially encloses the master device. The cartridge has an external shape and size that conforms to the profile of the docking bay in the slave device. In another embodiment, the physical interface adaptor comprises a frame supporting the master device. The frame is structured with an internal profile conforming to at least a part of the master device housing, and an external form factor sized and shaped to directly fit inside the docking bay in the slave device housing. In another embodiment, the physical interface adaptor further comprises an adaptor bar removably coupled to the frame, wherein the adaptor bar supports an electrical adaptor. In a further embodiment, the physical interface adaptor further comprises a cartridge receiving the frame, and supporting the adaptor bar if one is provided. In this embodiment, the frame provides a thinner form-fitting intermediate structure that closely conforms to the external profile of master device, and the inside of the cartridge. The frame is a simpler structure (hence cheaper to make), which can be provided for each different master device having a different external profile, for compatibility with a cartridge having a more elaborate structure (hence more expensive to make) for a particular slave device. In other words, the cartridge can be made universal for docking to a particular slave device, but different frames can be configured to fit different master devices for the same cartridge.

In one embodiment of the present invention, the master device is configured to switch control of the slave device in a "hot swap" manner, without requiring power down of the master device and/or the slave device.

In another aspect of the present invention, an enhanced charging and power management scheme is provided to optimize power management for the master device and the slave device. The scheme may be user programmable to dynamically allocate charging priority (which may include allocation of appropriate charging power) between the master device and slave device, based on battery charge levels in the master device and the slave device. The charging scheme may be further based on power usage by the respective master and slave devices.

BRIEF DESCRIPTION OF THE DRAWINGS

The accompanying drawings are included to provide a further understanding of the invention, and are incorporated to constitute a part of this specification. The drawings illustrate embodiments of the invention and, together with the description, serve to explain the principles of the invention. In the following drawings, like reference numerals designate like or similar parts throughout the drawings.

FIGS. 8A to 8C illustrate a physical interface adaptor, in accordance with a further embodiment of the present invention.

FIGS. 9A to 9C illustrate docking and undocking of the physical interface adaptor of FIGS. 8A to 8C to a slave device, in accordance with one embodiment of the present invention.

FIGS. 10A to 10C illustrate a physical interface adaptor, in accordance with still another embodiment of the present invention.

FIGS. 11A to 11C illustrate a physical interface adaptor, in accordance with yet a further embodiment of the present invention.

DESCRIPTION OF THE INVENTION

The present description is of the best presently contemplated mode of carrying out the invention. This invention has been described herein in reference to various embodiments and drawings. This description is made for the purpose of illustrating the general principles of the invention and should not be taken in a limiting sense. It will be appreciated by those skilled in the art that variations and improvements may be accomplished in view of these teachings without deviating from the scope and spirit of the invention. The scope of the invention is best determined by reference to the appended claims.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

The present invention provides a modular system of devices, in which a (master) device can be combined with one or more of the other (slave) devices in the system to transform to functional electronic devices (e.g., handheld cellular phone, tablet computing device, notebook PC device, netbook device, etc.) having expanded functionalities and features in expanded form factors and/or different platforms.

Figure 1:
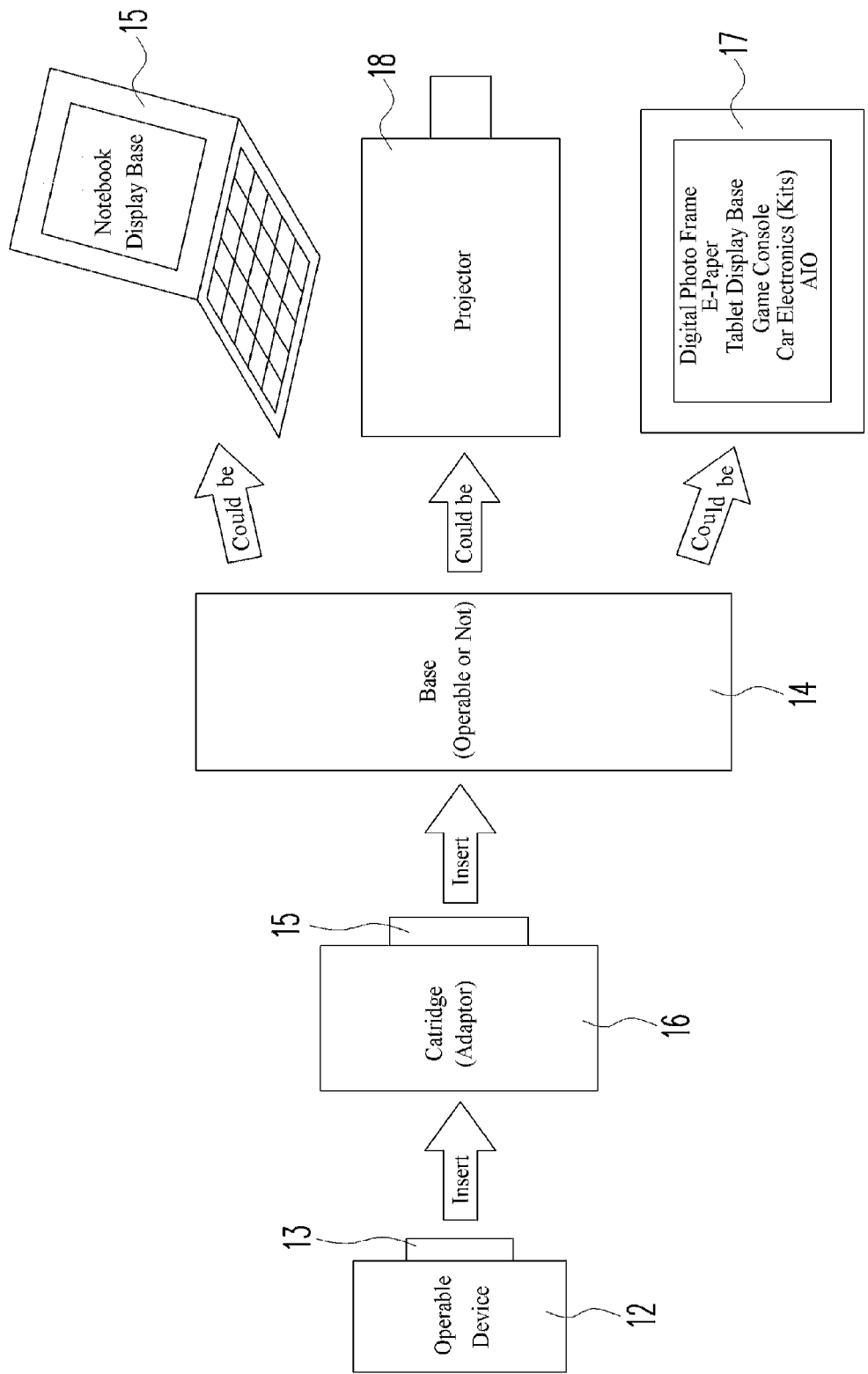
FIG. 1 is a schematic illustration of the modular system, in accordance with one embodiment of the present invention.

Referring to FIG. 1, the inventive modular system 10 is schematically and conceptually illustrated. Conceptually, the master device 12, a fully independently operable device, is dockable to a base slave device 14 of a larger form factor. In another aspect of the present invention, an intermediate, portable, removable physical interface adaptor (or docking adaptor) 16 is provided to facilitate docking of the master device to the slave device. The physical interface adaptor 16 comprises a first structure that conforms to at least a part of the housing of the master device 12, and a second structure that conforms to the docking bay in the slave device 14, such that at least a part of the master device housing can fit into the first structure and the second structure can fit into the docking bay in the slave device housing, so that the master device 12 can be docked into the housing of the slave device 14. The physical interface adaptor 16 supports an electrical and data port or interface 15 to provide data and power connections between an electrical port 13 on the master device 12 and a docking interface on the slave device 14. As will be explained in greater details below, data and electrical interfaces on the master device 12 communicates with the slave device 14 via the interface 15 on the physical interface adaptor 16.

In one embodiment, the physical interface adaptor 16 is configured in the form of a cartridge, having a case that substantially encloses the master device 12. The cartridge has an external shape and size that conforms to the profile of the docking bay in the slave device 14. The master device 12 can be inserted into the cartridge, which is in turn inserted into a docking bay in the slave device 14 to complete the transformation process. Given various master devices have external housings of different physical shapes and sizes, in order to provide compatibility of different master devices for docking to the same slave device, different physical interface adaptors are provided for different master devices. Different physical interface adaptors can be configured to fit different master devices for a particular slave device. A particular portable physical interface adaptor conforms to the form factor of a particular master device and conforms to a docking bay provided in a particular slave device housing, such that the master device can be docked to the slave device housing.

The slave device 14 could be a notebook display base device 15, a projector 18, and devices 17 such as a digital photo frame device, an e-paper device, a tablet display device, a game console, an electronic device adapted for use in a car, an all-in-one office equipment, etc. The modular system 10 reduces redundancy among the components of the various devices in the system, and instead improves operability with optimized and/or enhanced functionalities and features, as the master device transforms to a larger form factor and/or a different platform by combining with a slave device.

To illustrate the inventive concepts, the present invention will be discussed in connection with a handheld device in the form of a smartphone as the master device and a tablet display base device having a larger display as a base slave device (hereinafter referred to in short simply as a tablet device). The tablet device may be a "dumb terminal" with limited features and functionalities, but having better graphics resolution, better sound, etc. The smartphone may be installed with a powerful processor which runs various software applications, standing alone or docked to the base tablet device. When docked to the tablet device, the master smartphone can continue to run these applications, under the environment of the tablet device, for enhanced graphics and audio, enhanced wireless reception, etc., without the need for redundant applications to be installed in the tablet device.

Figure 2:
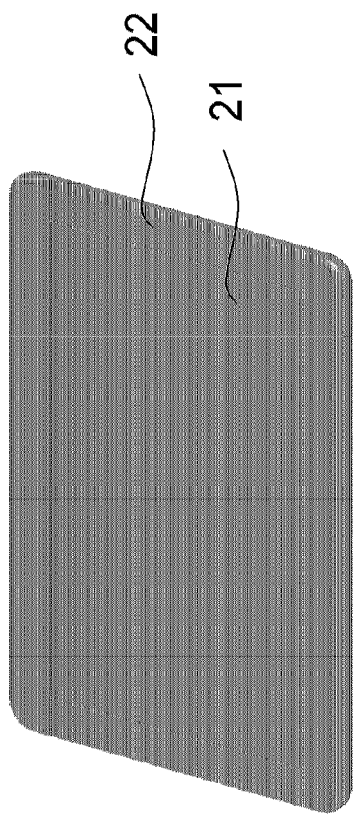
FIGS. 2A and 2B illustrate the front and rear views of a master device docked to a slave device, in accordance with one embodiment of the present invention.
FIG. 2C illustrates the assembly of the components including a physical interface adaptor in the form of a cartridge, in accordance with one embodiment of the present invention.
Figure 2:
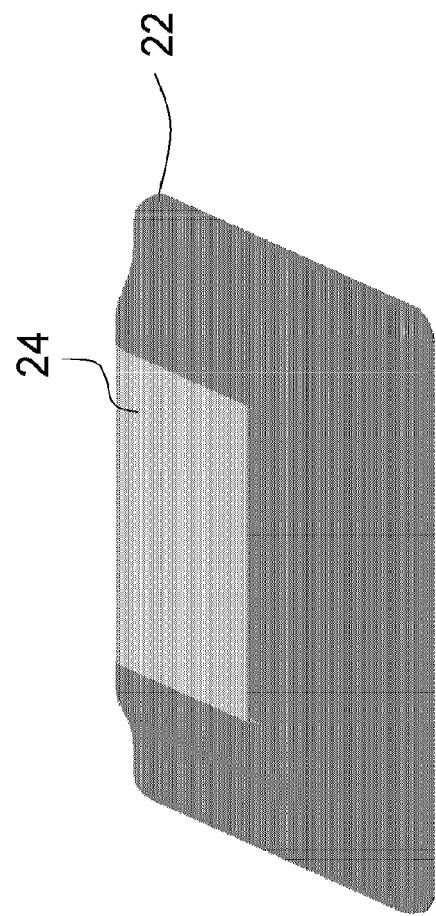
Figure 2:
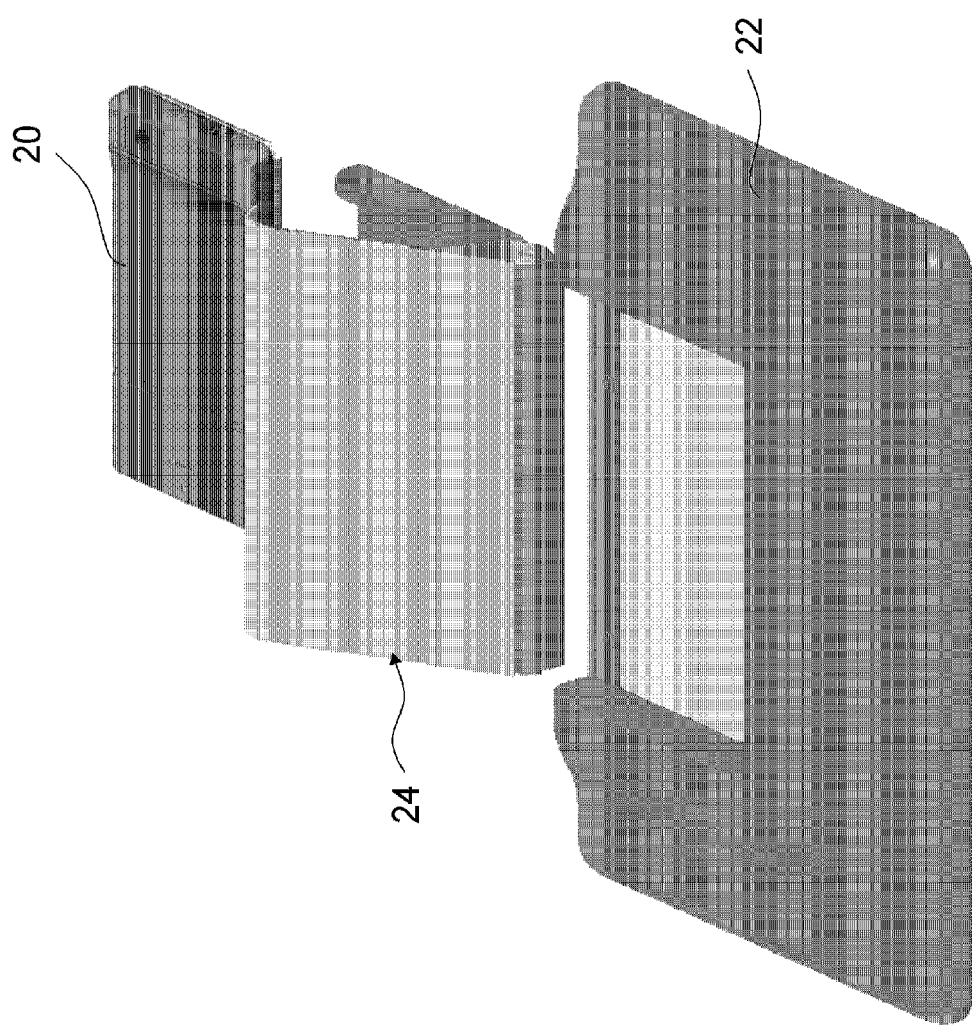

FIGS. 2A to 2C illustrate the front and rear views of a tablet device 22, with a physical interface adaptor in the form of a cartridge 24 containing a smartphone 20 docked in the rear of the tablet device 22, in accordance with one embodiment of the present invention. In the illustrated embodiment, the tablet 22 has a generally planar body, including a display screen 21 extending substantially covering the area within the edges of the body. The smartphone 20 has a smaller form factor compared to the tablet device 22. The smartphone 20 has its own display screen. The cartridge 24 provides the physical interface (or compatibility of physical docking) between the smartphone 20 and the tablet device 22. Given various master devices have different physical shapes and sizes, different cartridges are provided to provide compatibility of different master devices for the same slave device or different slave devices. In the illustrated embodiment, the smartphone is substantially contained in the tablet device 22 upon docking The master smartphone 20 is docked to the slave tablet device 22 via a physical interface and a data/electrical port or interface, to transform the smartphone 20 to the larger form factor of the tablet device 22, with the smartphone 20 maintaining control of the tablet device 22, substantially based on the operating system installed in the smartphone 20, with access to the data, application programs, functionalities and features embodied in the smartphone 20. The smartphone 20 provides control and/or stored data to operate the otherwise non-functional tablet device 22. The smartphone 20 and the tablet device 22 share control of the master device/smartphone 20, hardware, software and data, to reduce redundancy between these two devices, in a manner that provides additional or different functions and features in an optimized and/or enhanced manner as the smartphone 20 transforms to complete a functional tablet device 22.

In the illustrated embodiment, when undocked, the smartphone 20 is independently functional with its own set of features. For example, the smartphone 20 has its own operating system (O/S), a system processor (e.g., a central processing unit (CPU)), a basic input/output system (BIOS) (which may be part of the system processor), memory (e.g., flash memory, RAM, solid state drive, etc.), display, keyboard, microphone, speakers, associated analog and digital circuitry, battery, etc. In one embodiment, the slave device is a dumb base device (w/o its own operating system and otherwise non-functional) with limited features and functionalities, without any or any significant processing power of its own, and having different I/O specification (e.g., graphics resolution, audio, etc.). For example, the tablet device has memory (e.g., flash memory, RAM, solid state drive, etc.), display, keyboard, microphone, speakers, associate analog and digital circuitry, battery, etc., but no system processor. When the smartphone 20 is docked to the larger tablet device 22, the smartphone's system processor and operating system are used to run the tablet device 22, and further the application programs residing in the smartphone 20, in the physical peripheral environment provided by the tablet device (e.g., enhanced display, large touch screen, higher power speakers, higher resolution camera, etc). Additional application software may be installed in the tablet device 22, which system processor in the smartphone 20 can run as well. In one embodiment, only the master device (i.e., the smartphone 20) includes software programs and drivers. In the illustrated embodiment, only the smartphone 20 has application software and drivers installed therein, and the slave tablet device 22 has limited functions such as power charging and data storage, in addition to enhanced user interface.

An operating system is understood by those skilled in the art to include master control program that runs the electronic device (e.g., a cell phone, a notebook computer, etc.). The operating system sets the standards for all application programs that run in the particular electronic device. The application programs "talk to" the operating system, for example, for user interface and file management operations. The operating system typically performs functions including user interface management, job management, task management, data management, and device management, among other tasks. On the other hand, a BIOS, however, is understood by those skilled in the art to include a limited set of basic routines in an electronic device, which are stored on a chip and provides an interface between the operation system and the hardware in the electronic device. The BIOS supports the peripheral functions and basic internal services such as the real-time clock (time and date). Upon startup (booting) of the electronic device, the BIOS tests the system and prepares the electronic device for operation by querying its own small memory bank for drive and other configuration settings. The BIOS then loads the operating system and passes control to it.

In one embodiment, the tablet device 22 may have no or limited processing power or limited co-processing power as compared to the processing power of the system processor that runs the operating system in the smartphone 20. Such limited, specific processing may be required for operations of specific peripherals in the larger tablet device 22, such as I/O drivers, graphics drivers, human interface devices, etc, or other limited operation control functions for the peripheral components uniquely associated with the particular slave device (e.g., in the case of the slave device being an image projector device (e.g., projector 18 in FIG. 1), the slave device may have limited processing control of the projection mechanism and power management). For example, the tablet device 22 may have its own application specific integrated circuit (ASIC) hard-coded with routines to undertake the limited, specific tasks, which do not correspond to an operating system, and in particular the operating system installed in the master device. Notwithstanding, the operating system in the smartphone 20 provides significantly more functionality than any limited device operation control related routines that may be provided in the tablet device, and the system processor in the smartphone 20 provides significantly higher processing power than any processor provided in the tablet device 22.

The control system of the smartphone 20 (including system processor and system software (i.e., operating system)) is configured to automatically detect docking status and switch between control of the device components in the smartphone 20 and the tablet device 22, e.g., from control of the human interface devices provided in the smartphone 20 to those provided in the tablet device 22. The docking status may be determined by the smartphone 20 by electronically sensing docking connection of the smartphone 20 to the tablet device 22, or by triggering with a physical switch as the smartphone 20 is docked to the tablet device 22. The smartphone 20 is configured to switch control of the various components (e.g., display, touch input, audio output, etc.) between the smartphone 20 and tablet device 22 automatically in accordance with the docking status determined.

For example, the system software in the smartphone 20 device is configured in a manner such that upon confirming docking of the smartphone 20 to the tablet device 22, it automatically switch from control of the internal touch interface, display panel, speakers, microphone, etc. in the smartphone 20, to the external touch interface, display panel, speakers, microphone, etc. provided in the tablet device 22. The display of the smartphone 20 may be turned off (or maintained on as a secondary display), and the image output is automatically switched to the display panel in the tablet device 22, with the image quality or characteristics (resolution or DPI) automatically being adjusted from that associated with the display panel of the smartphone 20 to that associated with the display panel of the tablet device 22. For example, when docked, the smartphone 20 has been configured to reset the display driver settings to conform to the tablet 22, so as to display larger icons on the larger display in the tablet device 22, and/or at higher resolution or DPI. Accordingly, upon docking, the applications in the smartphone 20 automatically begin to use the external peripherals and human interface devices made available by the tablet device 22. Further upon docking, in the case of the smartphone 20, the audio switch in the smartphone 20 switches the phone voice data path with the modem in the tablet device 22 (in the case of a phone), from internal receiver/speaker and internal microphone in the smartphone 20, to external speakers and external microphone available in the tablet device 22. Further, if a wireless antenna is provided in the tablet device 22, the smartphone 20 may switch to using the external antenna in the tablet device 22, if the smartphone 20 provides an RF external connector.

Referring to FIGS. 22 to 25, the system software installed in the smartphone 20 comprises various software layers (e.g., Application, Framework, Hardware Abstraction Layer (HAL), and OS Kernel), and various drivers (e.g., Internal Touch Driver, External Touch Driver Graphic Driver, Audio Driver, MIPI-DSI (Mobile Industry Processor Interface—Display Serial Interface) Driver, HDMI (High Definition Multimedia Interface) Driver, RIL (Radio Interface Layer) Driver, and Operational (OP) Mode Detector Driver). The system software interacts with various internal hardware (i.e., within the smartphone 20) and external hardware (i.e., within the tablet device 22), including, for example, Internal Touch panel, External Touch panel, Internal LCM (liquid crystal module), External LCM, Internal Speaker, External Speaker, Internal MIC, External MIC, Audio Switch, and Modem. In the illustrated embodiments in FIGS. 22 to 25, all the necessary software and drivers are included in the smartphone 20.

Figure 22:
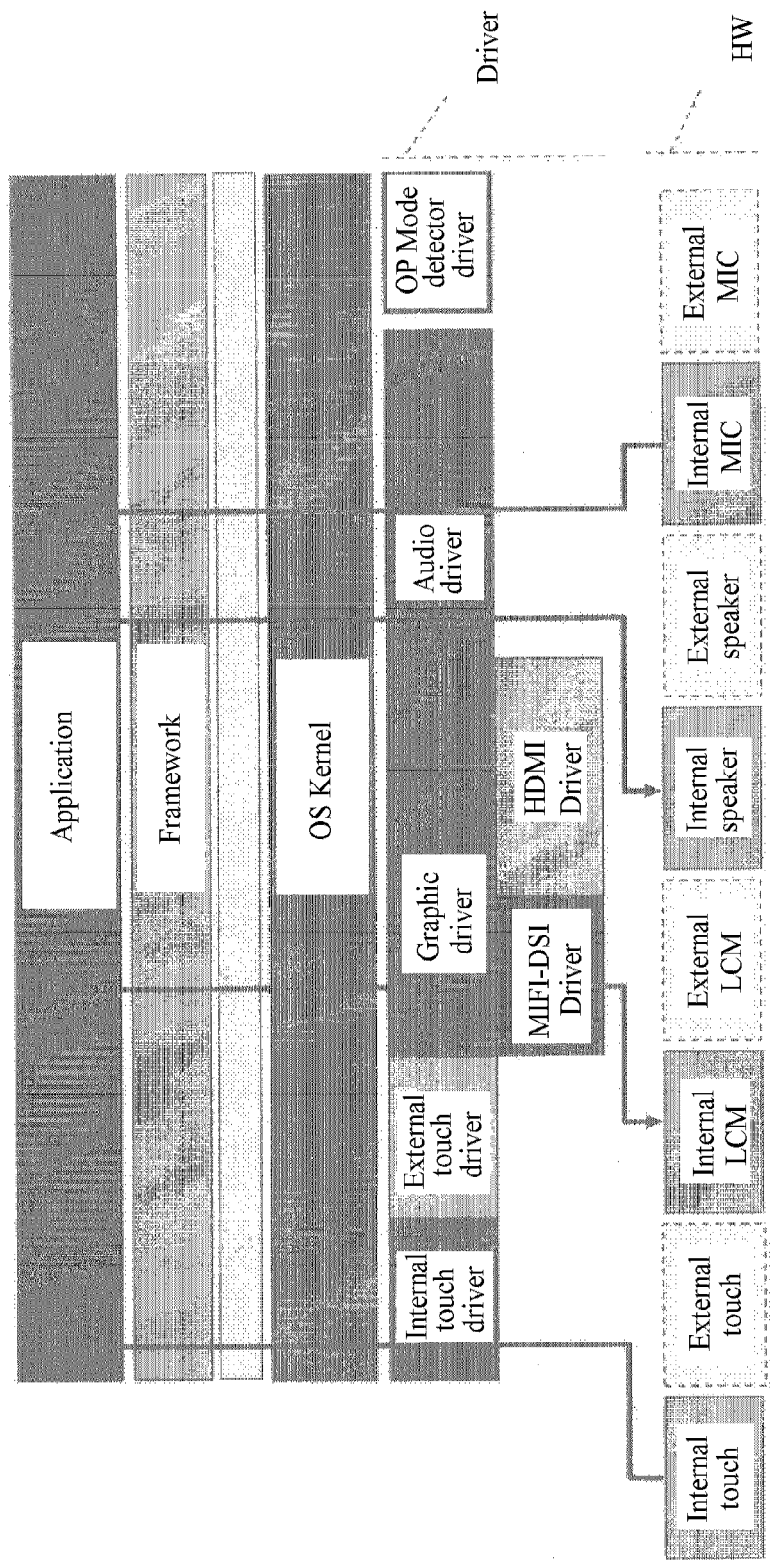
FIG. 22 illustrates the data I/O path for the mode in which the master device is not docked to the slave device, in accordance with one embodiment of the present invention.

FIG. 22 illustrates the data I/O path for the mode in which the smartphone 20 is not docked to the tablet device 22. As illustrated, the system software within the smartphone 20 interacts with the internal hardware (e.g., Internal Touch panel, Internal LCM, Internal Speaker and Internal MIC) via appropriate drivers.

Figure 23:
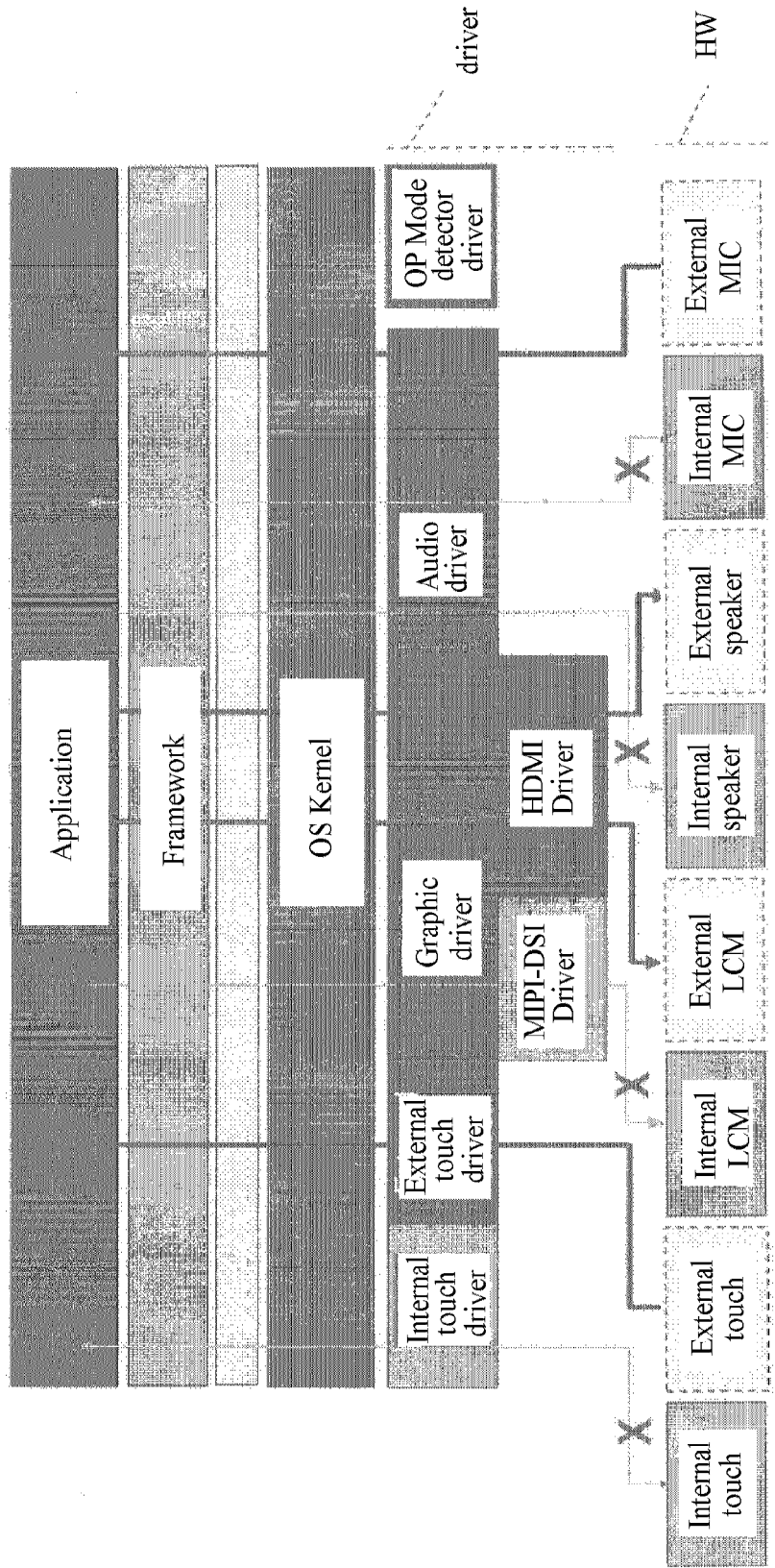
FIG. 23 illustrates the data I/O path for the mode in which the master device is docked to the slave device, in accordance with one embodiment of the present invention.

FIG. 23 illustrates the data I/O path for the mode in which the smartphone 20 is docked to the tablet device 22. As illustrated, the system software within the smartphone 20 switches to interact with various external hardware found on the tablet device 22 (e.g., External Touch panel, External LCM, External Speaker and External MIC) via appropriate drivers, some of which are different from those employed in the undocked mode (e.g., External Touch Driver and HDMI Driver, since the External Touch, External LCM and External Speaker on the tablet device 22 are at high resolution/definition compared to the Internal LCM and Internal Speaker on the smartphone 20).

Figure 24:
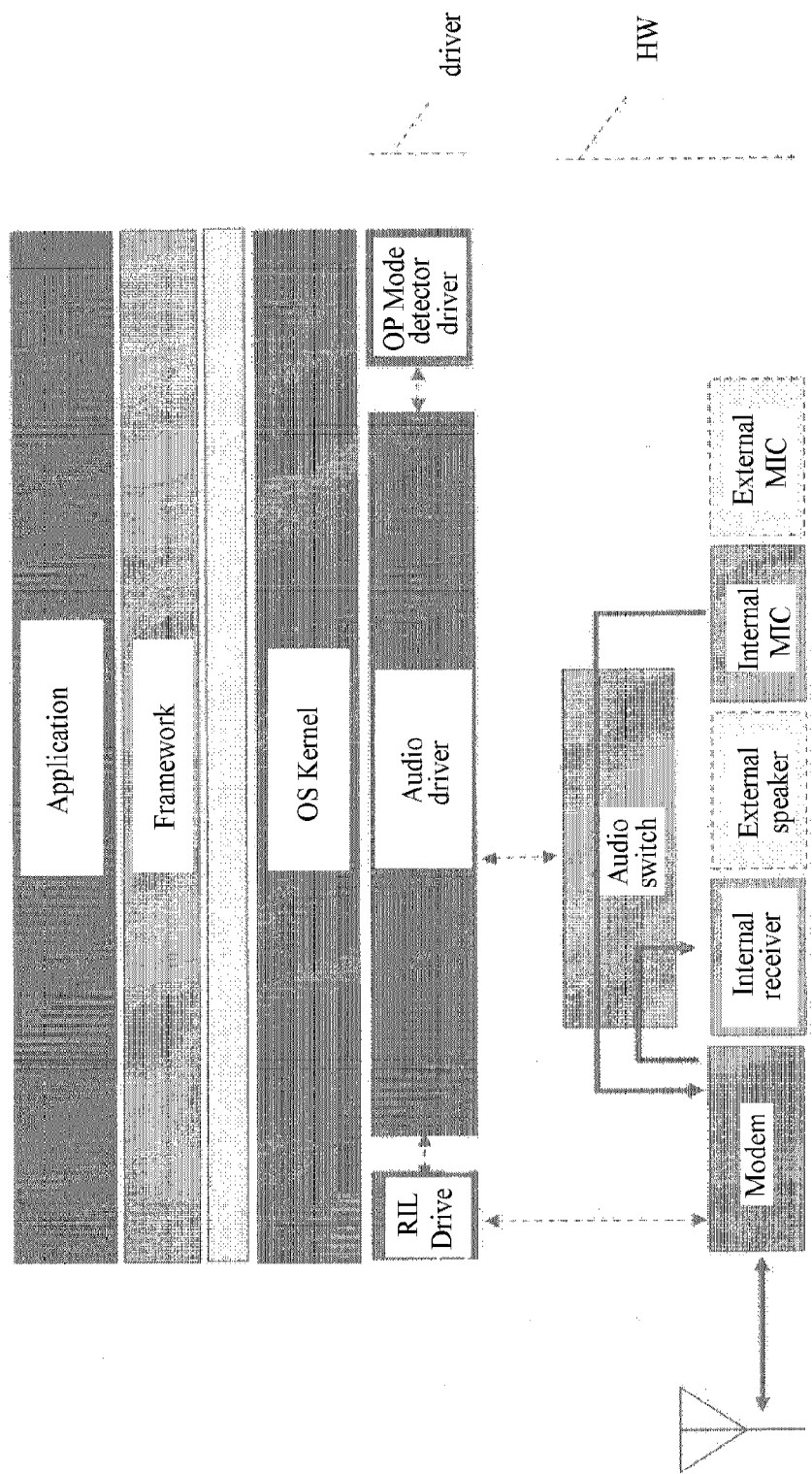
FIG. 24 illustrates the voice data path for the mode in which the master device is not docked to the slave device, in accordance with one embodiment of the present invention.

FIG. 24 illustrates the voice data path for the mode in which the smartphone 20 is not docked to the tablet device 22. The Audio Switch provided in the smartphone 20 switches the Internal MIC and the Internal Receiver/Speaker to operate with the Modem that is controlled by the RIL Driver.

Figure 25:
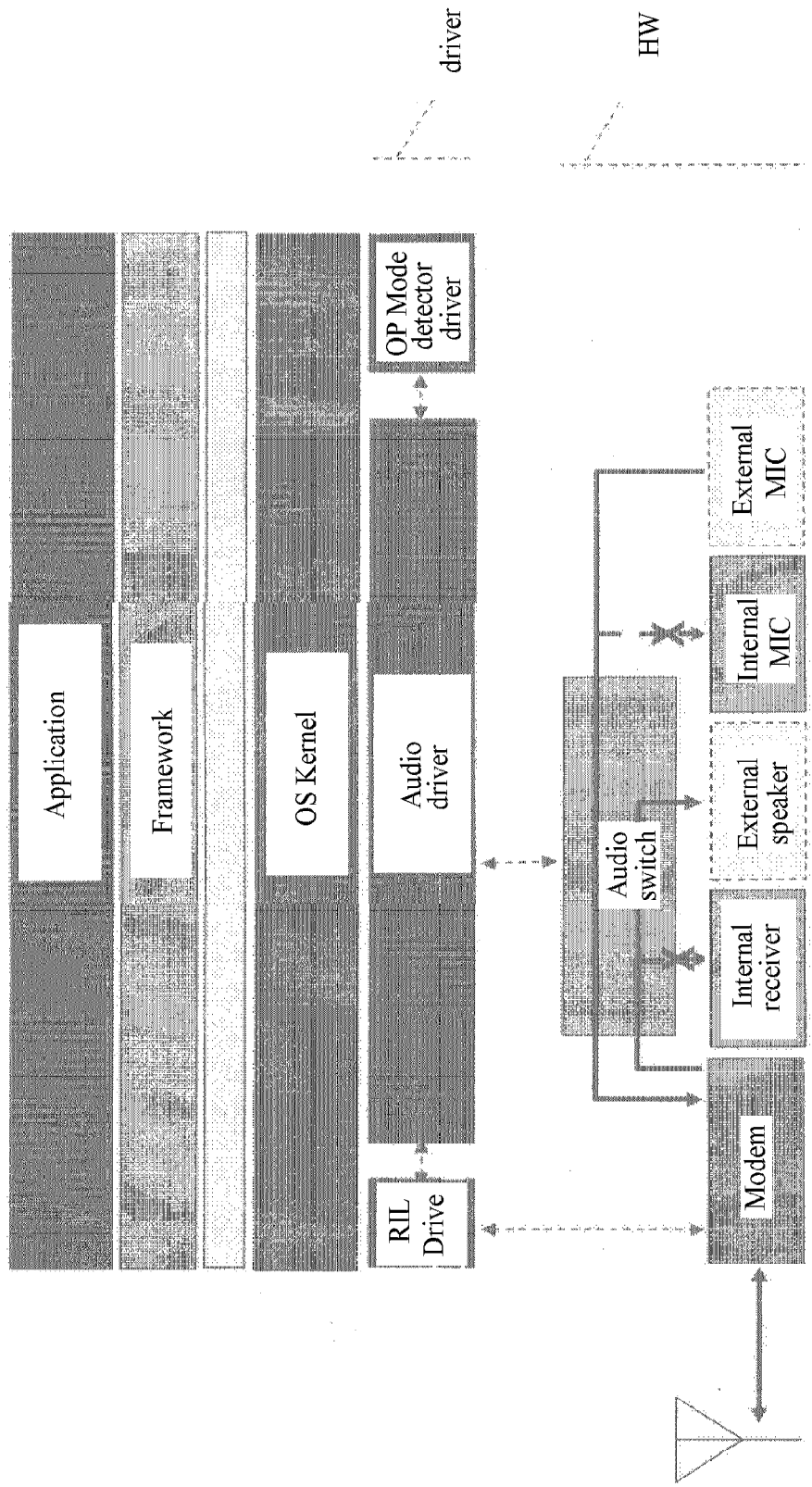
FIG. 25 illustrates the voice data path for the mode in which the master device is docked to the slave device, in accordance with one embodiment of the present invention.

FIG. 25 illustrates the voice data path for the mode in which the smartphone 20 is docked to the tablet device 22. The Audio Switch in the smartphone 20 switches the External MIC and the External Speaker to operate with the Modem.

In one embodiment of the present invention, the smartphone 20 is configured to switch control to include the tablet device 22 in a "hot swap" manner, without requiring power down of the smartphone 20 and/or the tablet device 22. For example, in the AVD slot illustrated in FIG. 15 and described below, in the HDMI portion, the HDMI_DETECTION pin could be used for insertion detection, in connection with hot swap operation.

Figure 3:
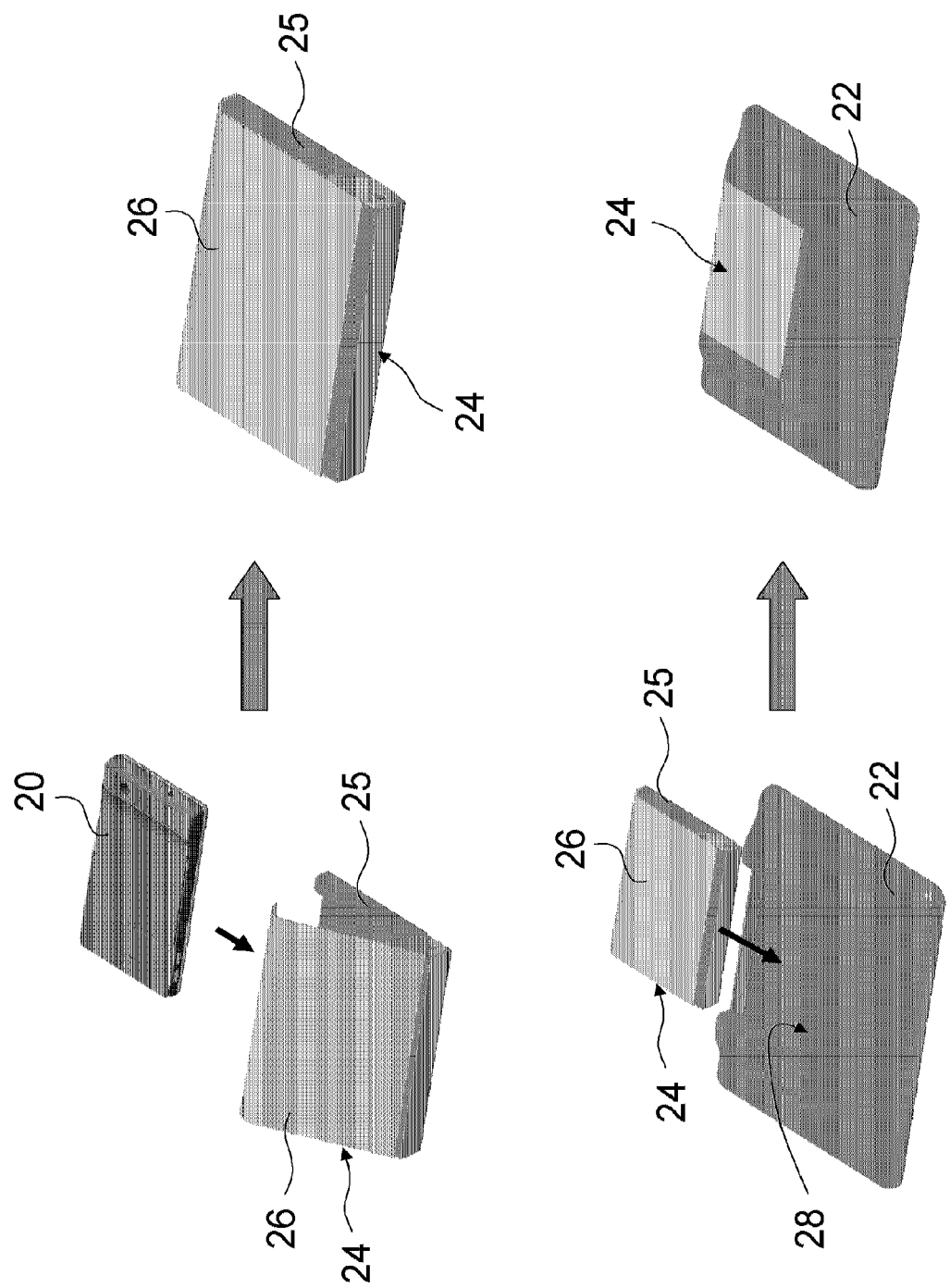
FIG. 3 illustrates docking and undocking, in accordance with one embodiment of the present invention.
Figure 4:
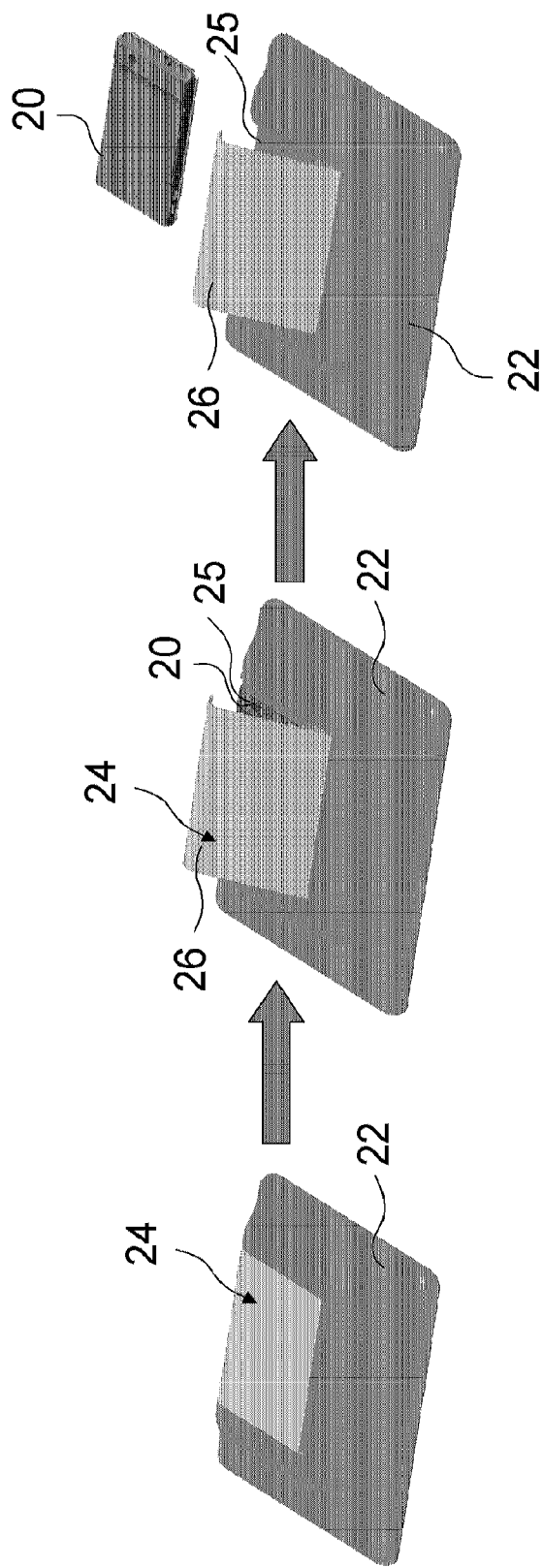
FIG. 4 illustrates removal of a master device from the docked state, in accordance with one embodiment of the present invention.

FIG. 3 illustrates the steps undertaken in the transformation process involving docking of the smartphone 20 into the tablet device 22. Specifically, in the illustrated embodiment, the cartridge 24 is configured generally with a housing 25 having a pivoted cover or lid 26. After the smartphone 20 is inserted by sliding into the cartridge 24, the lid 26 is closed against the housing 25, and then inserted by sliding into the docking bay 28 at the rear of the tablet device 22, thereby completing the transformation/docking process. FIG. 4 illustrates the steps undertaken to extract the smartphone 20 from the tablet device 22. The lid 26 of the cartridge 24 is opened, and the smartphone 20 is slid out of the housing 25 of the cartridge 24 without having to first remove/undock the cartridge 24 from the tablet device 22. In this embodiment, the cartridge 24 may first be docked to the tablet device 22, before the smartphone 20 is inserted into the cartridge 24.

Other than the tablet device 22, the smartphone 20 may be docked to other different slave devices (e.g., a notebook display base device 15 in FIG. 1) via a physical port or interface and a data/electrical port or interface, to complete different functional electronic devices of different form factors and/or platform, to achieve enhanced functionalities or a different set of functionalities. In one embodiment, a different cartridge is configured to provide a cavity sized and shaped to receive a particular model of smartphone. Different cartridges having the same external shape and size but different interior spaces and data/physical interfaces are provided to accommodate the different models of smartphone of different shapes and sizes. This provides compatibility and interchangeability for different smartphones with the same tablet device, or with other different slave devices having same docking interface for cartridges having the same external shape and size.

The cartridge 24 has an internal data/electrical connector configured for coupling to a complementary connector on the master device, and an external data/electrical connector for coupling to a complementary connector on the slave device when the master device is docked to the slave device. The internal and external connectors are conductively coupled (e.g., by a cable or flexible or rigid printed circuit board) to transfer data and/or electrical signals. To provide compatibility among various cartridges for different master devices, the external data/electrical connectors for different cartridges are of the same configuration, with the internal data/electrical connectors configured for specific master devices. In one embodiment, the internal data/electrical connector is fixed to the cartridge or connected to the cartridge by a flexible cable, for connection to the master device. The external data/electrical connector can also be fixed to the cartridge or connected to the cartridge by a flexible cable. Instead of connecting to the cartridge, the internal and external connectors are interconnected by a cable passing through the cartridge body wall, which cable may not be affixed to the cartridge body. If the internal connectors are fixed to the cartridges, different cartridges for different master devices could have different internal connectors at different locations within the respective cartridges, to complement the connectors on the particular master devices to be used with the cartridges.

Figure 5:
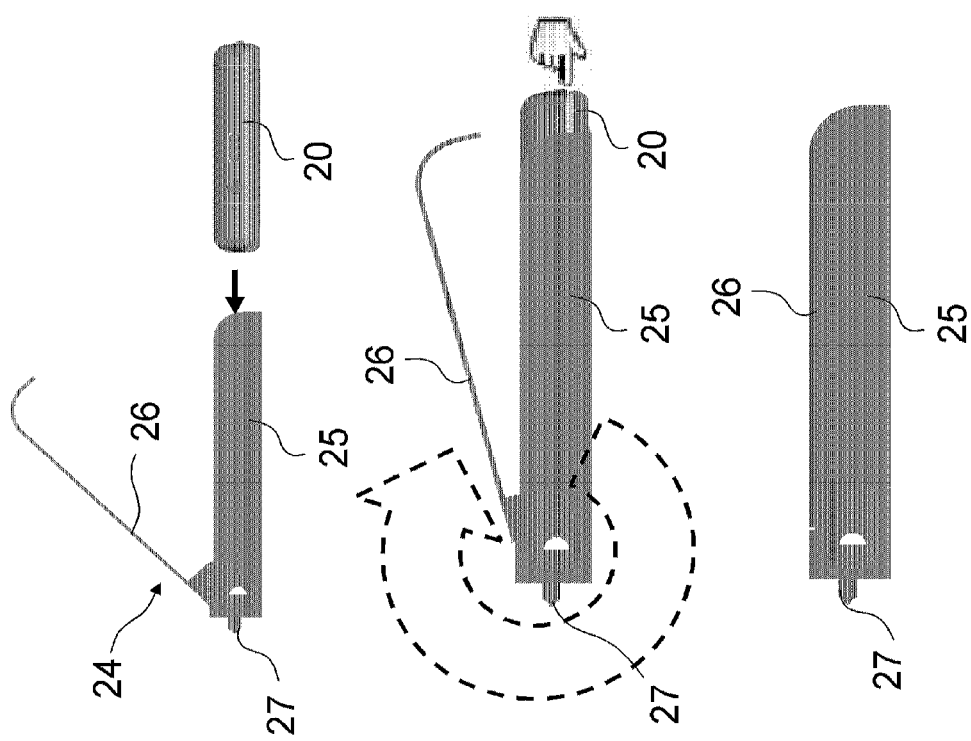
FIGS. 5A and 5B illustrate insertion and removal of a master device into and out of a cartridge, in accordance with one embodiment of the present invention.
Figure 5:
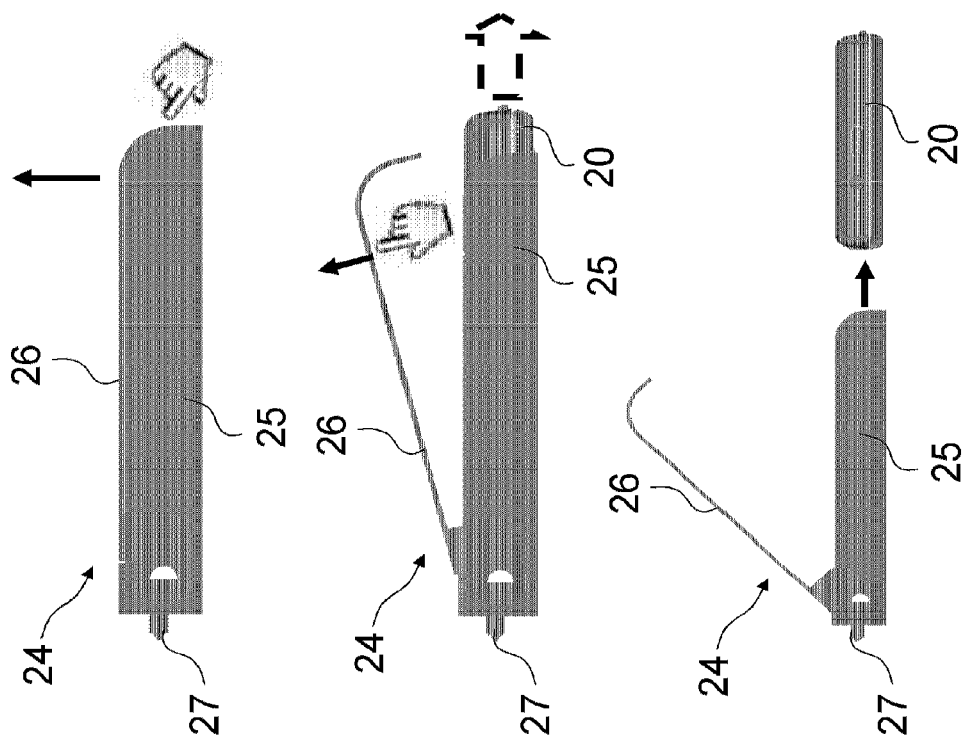

The cartridge is configured to facilitate insertion and release of the smartphone 20 in and from the cartridge. In one embodiment, as the smartphone is inserted into the cartridge by sliding the smartphone into the cartridge, a complementary data/electrical port on the smartphone is coupled to the internal data/electrical connector in the cartridge. An interlocking mechanism (e.g., a cover provided on the cartridge, locking tabs or knobs) may be configured to provide positive interlocking of the master device within the cartridge, to ensure that the master device is securely and completely inserted into the cartridge. Referring to embodiment in FIG. 5, the cartridge 24 has an external data/electrical connector 27 at the outside of the rear edge of the housing 25. At the rear edge on the inside of the housing 25, an internal data/electrical connector (not shown) is provided. With the lid 26 open, as the smartphone 20 is inserted into the housing 25, the data/electrical ports at the edge of the smartphone 20 couples with the internal connector. The pivotable lid 26 is configured such that the insertion of the smartphone 20 also closes the lid 26 by cam action, to fully enclose the smartphone 20 within the cartridge 24. Referring to FIG. 5B, to remove the smartphone 20 from the cartridge 24, the lid 26 is pivoted open, and the data/electrical port of the smartphone 20 is separated from the internal data/electrical connector at the inside of the rear edge of the housing 25. As the lid 26 is pivoted open, the smartphone 20 is also ejected from the housing by cam action. The internal data/electrical connector and the cam action can be better understood in connection with the embodiment below.

Referring to the embodiment in FIG. 6A, the cartridge 34 has a housing 35 with a pivotable lid 36. At the outside of the rear edge of the housing 35, an external data/electrical connector 37 is provided. Internal data/electrical connectors 38 are provided on a spring biased floating plate 39 parallel to the inside of the rear edge of the housing 35, which are electrically connected to the external data/electrical connector 37. Referring also to FIG. 6B, it can be seen that as the smartphone 20 is inserted into the housing 35, the data/electrical ports on the smartphone 20 engage the internal data/electrical connectors 38, and the rear edge of the smartphone 20 pushes against the floating plate 39, to compress the springs 46. The smartphone 20 is held in place in the housing 35 when the lid closed. FIG. 6B shows the cam action between the plate 39 and the lid 36. The cam 31 at the back of the plate 39 interacts with the hook 33 at pivoted end of the lid 36, in a manner such that movement of the plate 39 towards the rear of the housing 35 would result in the cam 31 pulling the hook 33 to close the lid 36, and opening the lid 36 would result in the hook 33 pushing the cam 31 to move the plate towards the front of the housing 35. (A stop (not shown) may be provided (e.g., at the top of the housing 35) to interact with the lid 36 to prevent the extent the lid 36 can be opened, so that the cam 31 is within range of interaction with the hook 33.) Accordingly, by flipping open the lid 36, the plate 39 pushes the smartphone 20 out of the housing 35, through the front opening defined between the lid 36 and the housing 35. The data/electrical port of the smartphone 20 is separated from the internal data/electrical connector 38. In the illustrated embodiment, the plate 39 is biased by springs 46, in a direction towards the rear of the housing. This would keep the cam 31 against the hook 33 to maintain the lid 36 closed to securely retain the smartphone 20 inside the cartridge 34.

Figure 6:
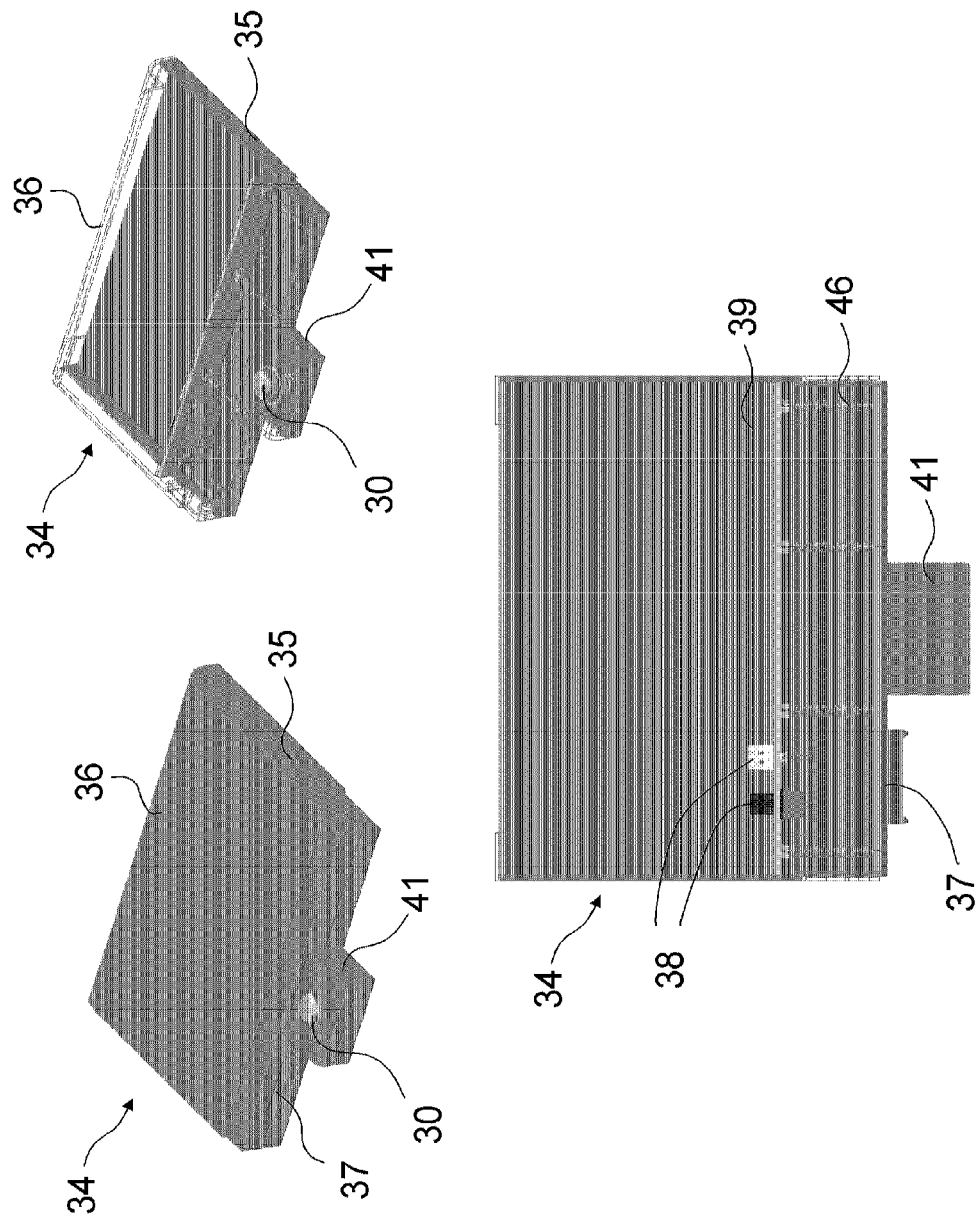
FIGS. 6A and 6B illustrate a cartridge, in accordance with another embodiment of the present invention.
Figure 6:
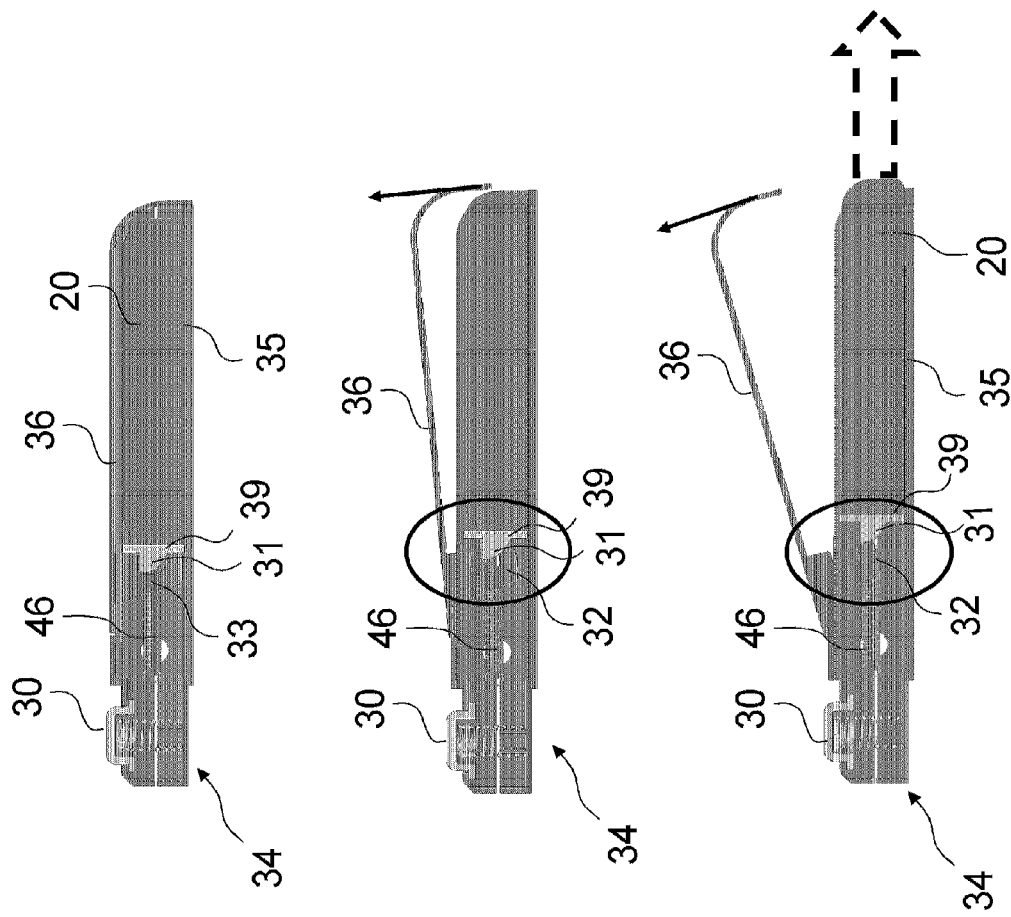
Figure 7C:
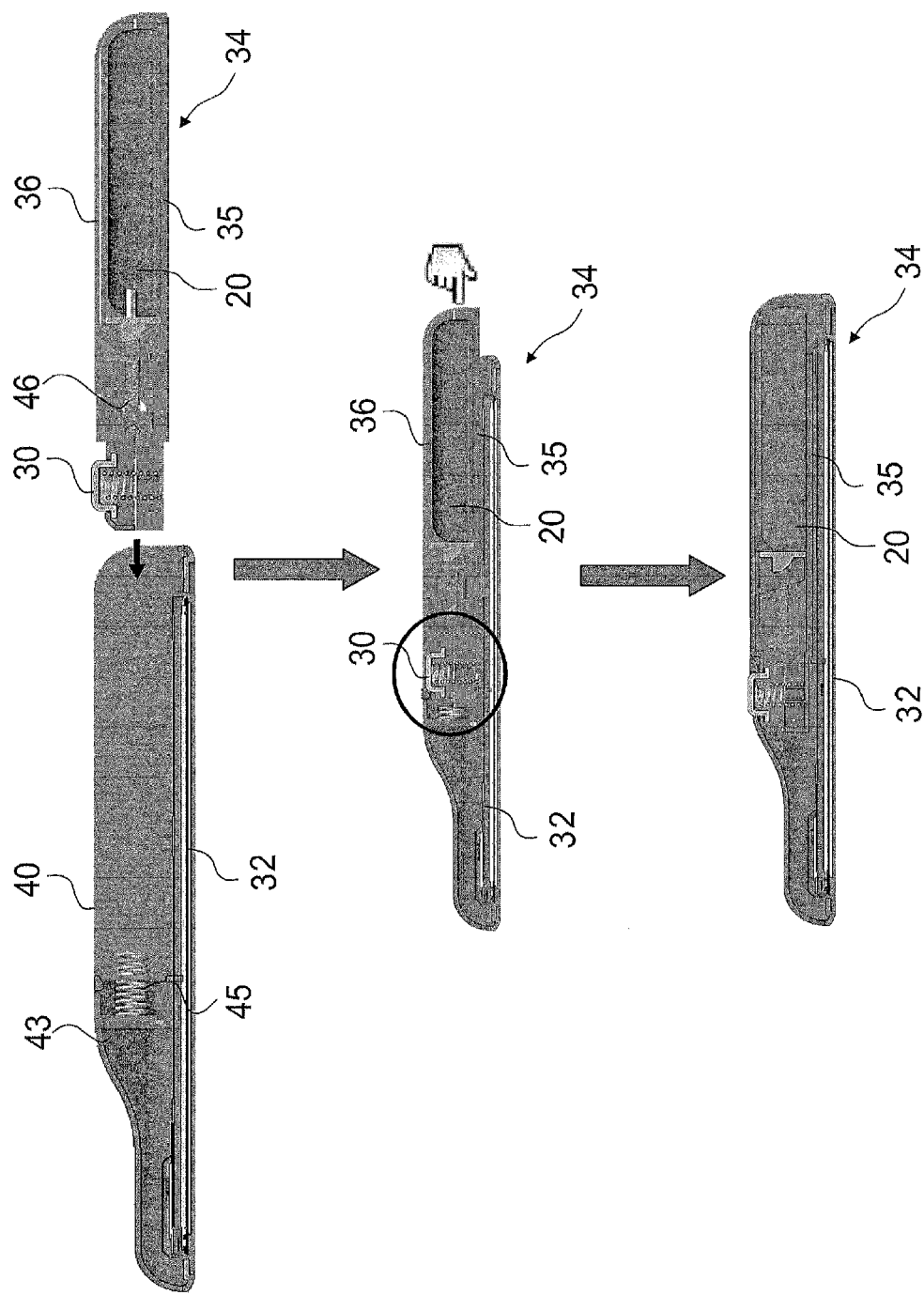
FIGS. 7A to 7E illustrate docking and undocking of the cartridge illustrated in FIGS. 6A and 6B to a slave device, in accordance with one embodiment of the present invention.
Figure 7:
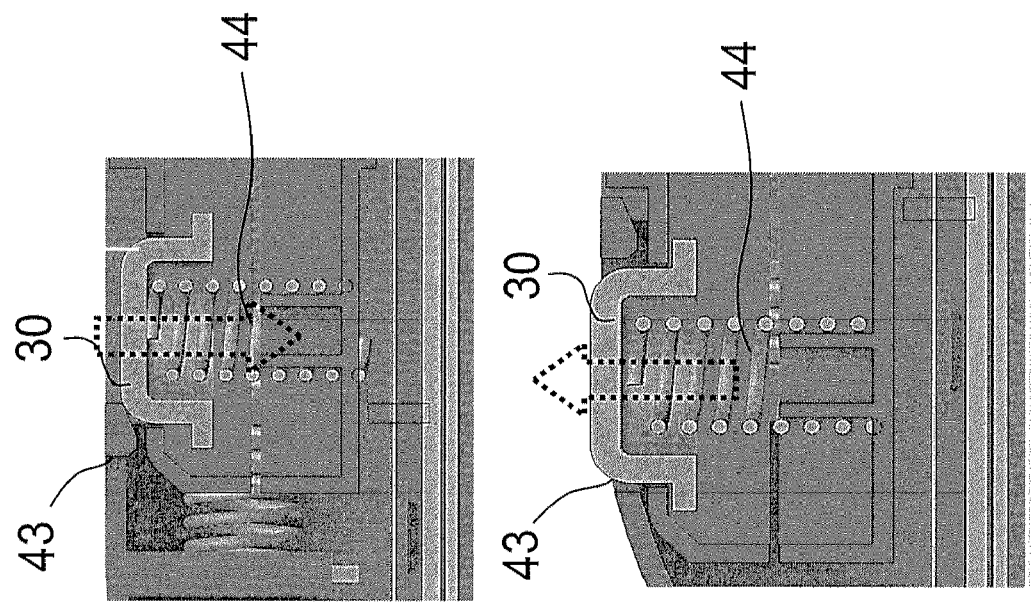

In the embodiment of FIG. 6, a spring loaded release button 30 is provided on a tab 41 extending from the rear of the cartridge housing 35, to facilitate locking and releasing of the cartridge 34 in connection with docking to a docking bay 40 of a tablet device 32. Referring to FIG. 7A, a complementary hole 43 is provided in the rear housing of the tablet device 32. Also referring to FIG. 7C, as the cartridge 34 is slid into the docking bay 40 at the rear of the tablet device 32, the tab 41 is received below the housing around the hole 43, and the button 30 is retained in the hole 40 under upward bias of the spring 44, to securely retain the cartridge 34 at the rear of the tablet device 32. The external data/electrical connector 37 at the rear of the cartridge 34 engages the complementary port provided at the docking bay 40 of the tablet device 32. FIG. 7E more clearly illustrates locking and release of the cartridge 34, based on the interaction of the button 30 and hole 43. Referring to FIG. 7B, to remove the cartridge, the button 30 is depressed against bias of the spring 44 to clear the hole 43, and the cartridge can then be slid out of the docking bay 40. Also referring to FIG. 7D, springs 45 are provided at the rear edge of the docking bay 40, to provide an outward bias in a direction to push the cartridge out of the docking bay 40 when the button 30 is released from the hole 43. The external data/electrical connector 37 at the rear of the cartridge 34 is separated from the data/electrical port at the docking bay 40 of the tablet device 32. Compared to the embodiment of FIG. 4 in which the smartphone 20 may be removed from the cartridge 24 that is still docked to the tablet device 22, in the present embodiment, the cartridge 34 is first removed/undocked from the tablet device 32 before the smartphone 20 is released from the cartridge 34.

FIG. 8 illustrates another embodiment of a physical interface adaptor in the form of a cartridge. FIG. 8A schematically illustrates a cartridge 54 in the form of a sleeve 55, having a front opening through which the smartphone 20 can be inserted and removed. The sleeve 55 contains the smartphone 20, exposing only an edge of the smartphone 20. There is no pivoted lid or cover in this embodiment. Referring to FIG. 8B, slidable locking tabs 52 are provided at the edge of the opening in the sleeve 55, for securely retaining the smartphone 20 within the sleeve. As in the previous embodiment, internal data/electrical connectors 58 are provided on a floating bar or plate 59 near the inside rear edge of the sleeve 55, and external data/electrical connectors 57 are provided at the outside rear edge of the sleeve 55. The internal connectors 58 and external connector 57 are electrically connected. A push-pull module 50 is provided to bias the floating plate 59 to facilitate ejection of the cartridge smartphone 20 from the sleeve 55. As the smartphone 20 is slid into the sleeve 55, the data/electrical ports on the smartphone 20 engages the internal data/electrical connectors 58 and pushes the plate 59 against the biasing force of the push-pull module 50. The tabs 52 are slid inwards to block the smartphone 20 from disengaging from the sleeve 55. To release the smartphone 20 from the sleeve, the tabs are slid outwards, allowing the smartphone 20 to be released from the sleeve 55. The smartphone 20 may be pushed out of the sleeve 55 if the push-pull module 50 is always at a "push" state, or the user may push the exposed edge of the smartphone 20 inward slightly, to trigger the push-pull module 50 to enter the "push" state to release the smartphone 20. The coupling between the data/electrical ports on the smartphone 20 and the internal connectors 58 is released when the smartphone 20 is released from the sleeve 55. The docking of the cartridge 54 to a tablet device 52 is illustrated in FIGS. 9A to 9C. As the cartridge 54 is slid into the docking bay 53 at the rear of the tablet device 52, the external data/electrical connector 57 couples to complementary data/electrical ports (not shown) in the docking bay 53.

In another embodiment, the physical interface adaptor comprises a frame supporting the master device. The intermediate frame is configured to fit between the master device and the cartridge. The frame is structured with an internal profile conforming to at least a part of the master device housing, and an external form factor sized and shaped to directly fit inside the cartridge, which has an external form factor that fits the docking bay in the slave device housing. The master device is first inserted into the frame, before insertion into the cartridge.

FIG. 10A schematically illustrates a cartridge 64 in the form of a sleeve 65, having a front opening through which a frame 62 holding the smartphone 20 can be inserted and removed. The sleeve 65 is configured similar to the sleeve 54 in FIG. 8A, except that the sleeve is open on the larger planar sides. The frame 62 is an intermediate bracket-like structure, which surrounds the edges of the smartphone 20. The smartphone 20 is first fitted with the frame 62, before the frame 62 is inserted into the sleeve 65. The frame 62 is provided with openings through which the internal data/electrical connectors in the sleeve 65 can couple with the data/electrical ports on the smartphone 20. FIGS. 10B and 10C illustrate the insertion of the frame 62 into the sleeve 65, which involves quite similar considerations as compared to those in connection with FIGS. 8B and 8C. The cartridge 65 can be docked to a tablet device 52 in a similar manner illustrated in FIGS. 9A to 9C, via external data/electrical connector 67.

In this embodiment, the frame provides a thinner form-fitting intermediate structure that closely conforms to the external profile of master device, and the inside of the cartridge. The frame is a simpler structure (hence cheaper to make), which can be provided for each different master device having a different external profile, for compatibility with a cartridge having a more elaborate structure (hence more expensive to make) for a particular slave device. In other words, the cartridge can be made universal for docking to a particular slave device, but different frames can be configured to fit different master devices for the same cartridge. The intermediate frame essentially provides another level of compatibility of the master device and the cartridge/sleeve, whereby master devices having different shapes and sizes may be made compatible with the same sleeve by providing frames of appropriate configurations.

In a further embodiment, the physical interface adaptor further comprises an adaptor bar removably coupled to a frame, wherein the adaptor bar supports an electrical adaptor. The frame may be configured to be coupled to an "open" cartridge that is in the form of an adaptor bar having connectors similar to the internal and external connectors in the earlier disclosed embodiments. The frame with the master device is coupled to the adaptor bar, before docking to the slave device. FIG. 10A schematically illustrates a cartridge 74 in the form of an adaptor bar 75. A frame 72 for holding the smartphone 20 is quite similar to the frame 62 in the previous embodiment shown in FIG. 10A. The adaptor bar 75 is provided with data/electrical connectors 78 on the side facing the frame 72, and data/electrical connectors 77 on an opposing side. The smartphone 20 is first fitted with the frame 72, before the frame 72 is coupled to the adaptor bar 75. A lock/release tab 73 is provided on the adaptor bar 75 to lock and release the frame 72 against the adaptor bar 75. In this embodiment, there is no external sleeve that contains the frame 72 that holds the smartphone 20. The frame 72 and adaptor bar 75 can be docked to a tablet device 52 in a similar manner illustrated in FIGS. 9A to 9C.

Figure 12:
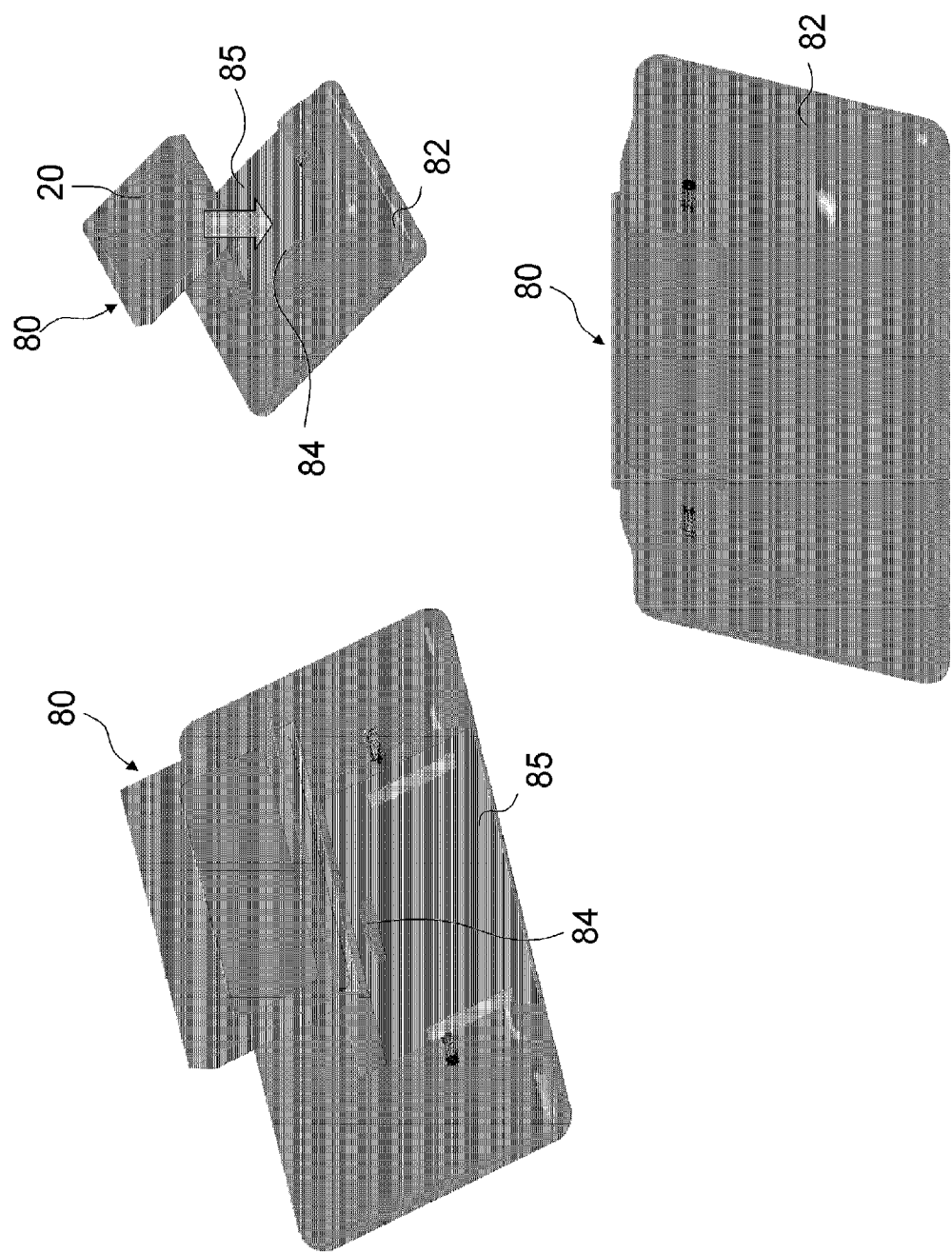
FIG. 12 illustrates docking of a physical interface adaptor to a slave device, in accordance with another embodiment of the present invention.
Figure 13:
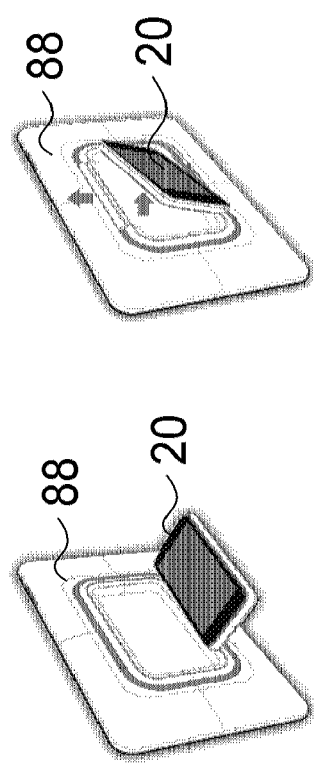
FIG. 13 illustrates docking of a master device to a slave device, in accordance with a further embodiment of the present invention.
Figure 14:
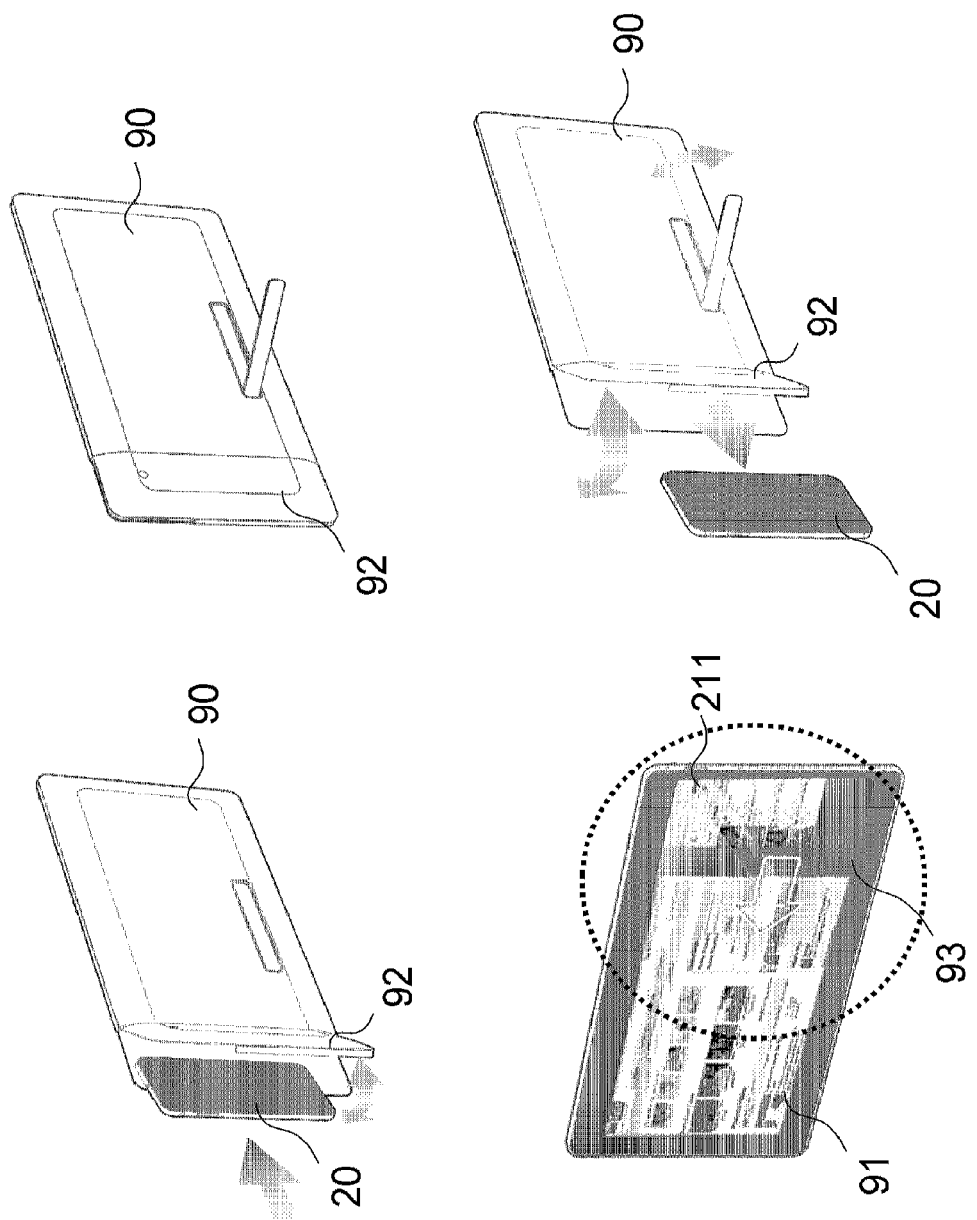
FIG. 14 illustrates docking and undocking of a master device to a slave device, in accordance with yet another embodiment of the present invention.

FIGS. 12 to 14 illustrate additional embodiments directed to docking to slave devices. In FIG. 12, the cartridge 80 is docked by pressing onto the rear docking bay in the tablet device 82, instead of sliding into the docking bay in the earlier embodiments. Given the different docking action, the docking data/electrical ports 84 is provided in the larger planar surface in the docking bay 85, to accommodate docking by pressing of the cartridge 80 onto the docking bay 85. The cartridge 80 may take similar form as those described in connection with the earlier embodiments, with the location of the external data/electrical connector appropriately located to complement the docking port 84. In FIG. 12, the cartridge 80 comprises a sleeve similar to the sleeve 64 in FIG. 10A, except for the location of the external data/electrical connectors. The cartridge 80 may be securely docked in the docking bay 85 by using magnetic force (eg., providing a magnet on either the sleeve of the cartridge 80 or the docking bay 85, and providing a complementary magnetic material on the docking bay 85 or the sleeve of the cartridge 80.

In the earlier embodiments, the docking bay is located near an edge of the rear of the planar tablet device. In the alternate embodiment illustrated in FIG. 13, the docking bay 86 is located substantially at the center of the rear of the planar tablet device 88, to provide more even weight distribution when the slave device (e.g., the smartphone 20) is docked to the tablet device 88. In this embodiment, the smartphone 20 is docked directly to the tablet device 88 without the presence of a cartridge. However, it is well within the scope and spirit of the present invention to provide a physical interface adaptor, such as those described above, for docking the smartphone 20.

In a further embodiment, the docking bar is located at the side of the planar tablet device. In FIG. 14, the docking bay 92 is at the side of the tablet device 90. The tablet device 90 has a large screen having a display section 91, and a transparent section 93 extending to cover the docking bay 92 at one side of the screen, to provide a window into the docking bay. When the slave device, in this case the smartphone 20, is docked into the docking bay 92, the display 211 of the smartphone 20 is visible through the transparent section 93, along with the image viewed at the display section 91 of the tablet device 90. This configuration provides additional graphical user interface features to the user, such as allowing the user to transfer content between the docked smartphone 20 and the tablet device 90 by a drag-and-drop procedure, by manipulating displayed information between the smartphone display 211 and the display section 91 of the tablet device 90. In this embodiment, the smartphone 20 is docked directly to the tablet device 90 without the presence of a cartridge. However, it is well within the scope and spirit of the present invention to provide a physical interface adaptor, such as those described above, for docking the smartphone 20.

Besides the illustrated tablet device, different other slave devices may be designed and configured with an appropriate set of peripheral components (e.g., display, microphone, speakers, antenna, etc.) optimized for specific applications when used in conjunction with the master device. For certain applications, given the high level of physical integration of components within a physical unit to optimize form factor, and the desire to optimize performance specific to a particular application, the master and slave devices may have some level of redundancy (e.g., the master device and the slave device may have different types of displays, speakers, microphones, etc. optimized for the respective applications of the master and slave devices).

Figure 15:
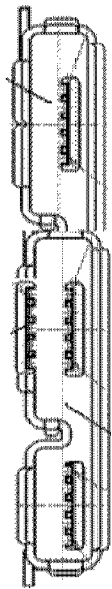
FIG. 15 illustrates a AVD combo slot, in accordance with one embodiment of the present invention.

In another aspect of the present invention, a novel data/electrical interface is provided. In particular an AVD combo slot connector is configured, which provides a combination of several interface standards, e.g., a combination of high definition multimedia interface (HDMI; e.g., micro HDMI type D), universal serial bus interface (e.g., USB 3.0; e.g., micro AB), and analog audio interface, or a combination of USB and HDMI interfaces. The AVD combo slot provides for digital audio and video streaming, data transfer, and peripheral control. In one embodiment, a specific AVD audio interface connector socket and pin definition is provided, as illustrated in FIG. 15. A wireless interface may also be provided, such as a Bluetooth wireless interface.

Figure 16:
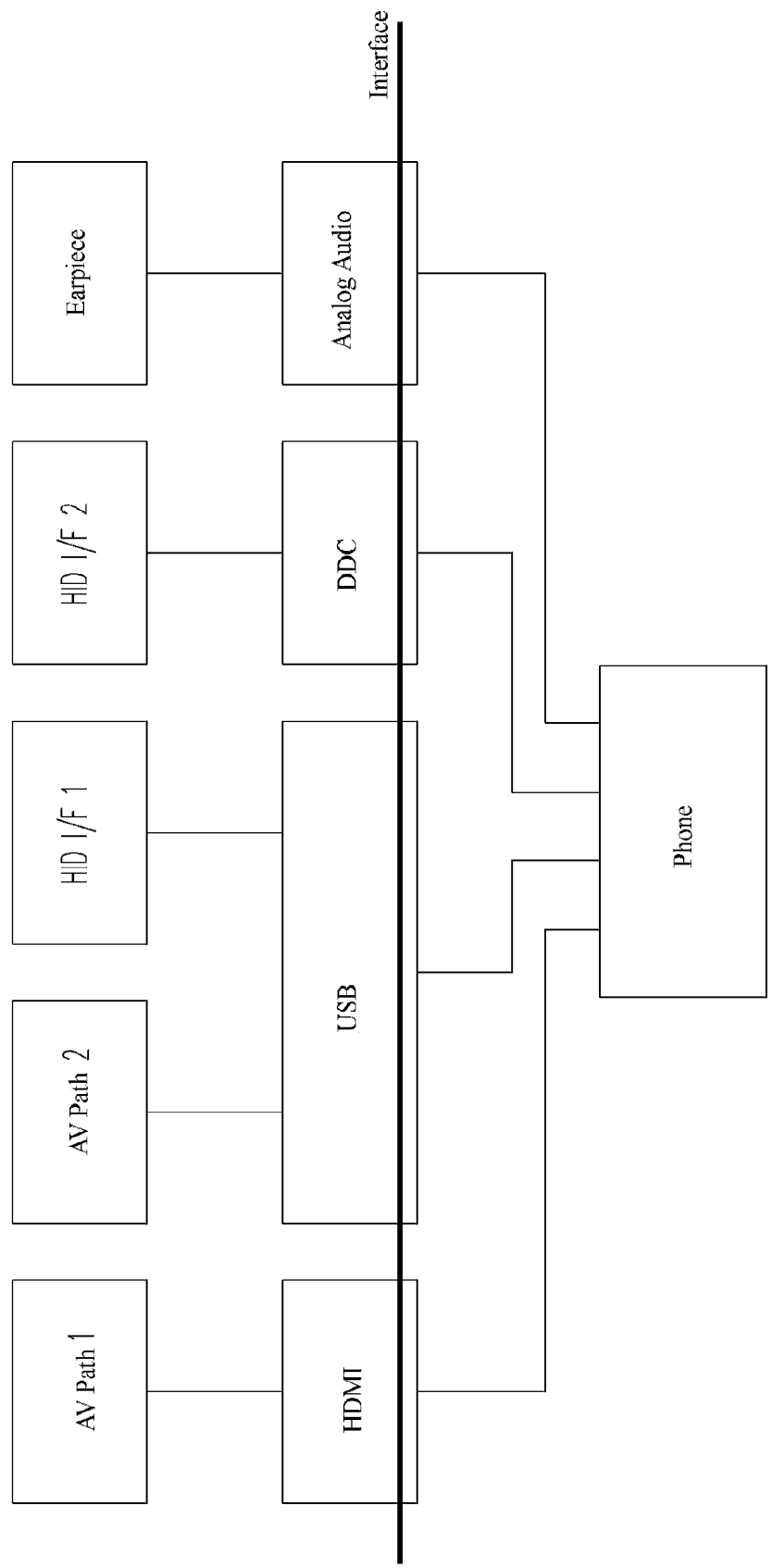
FIG. 16 illustrates the wire interfaces provided on a master device, in accordance with one embodiment of the present invention.
Figure 17:
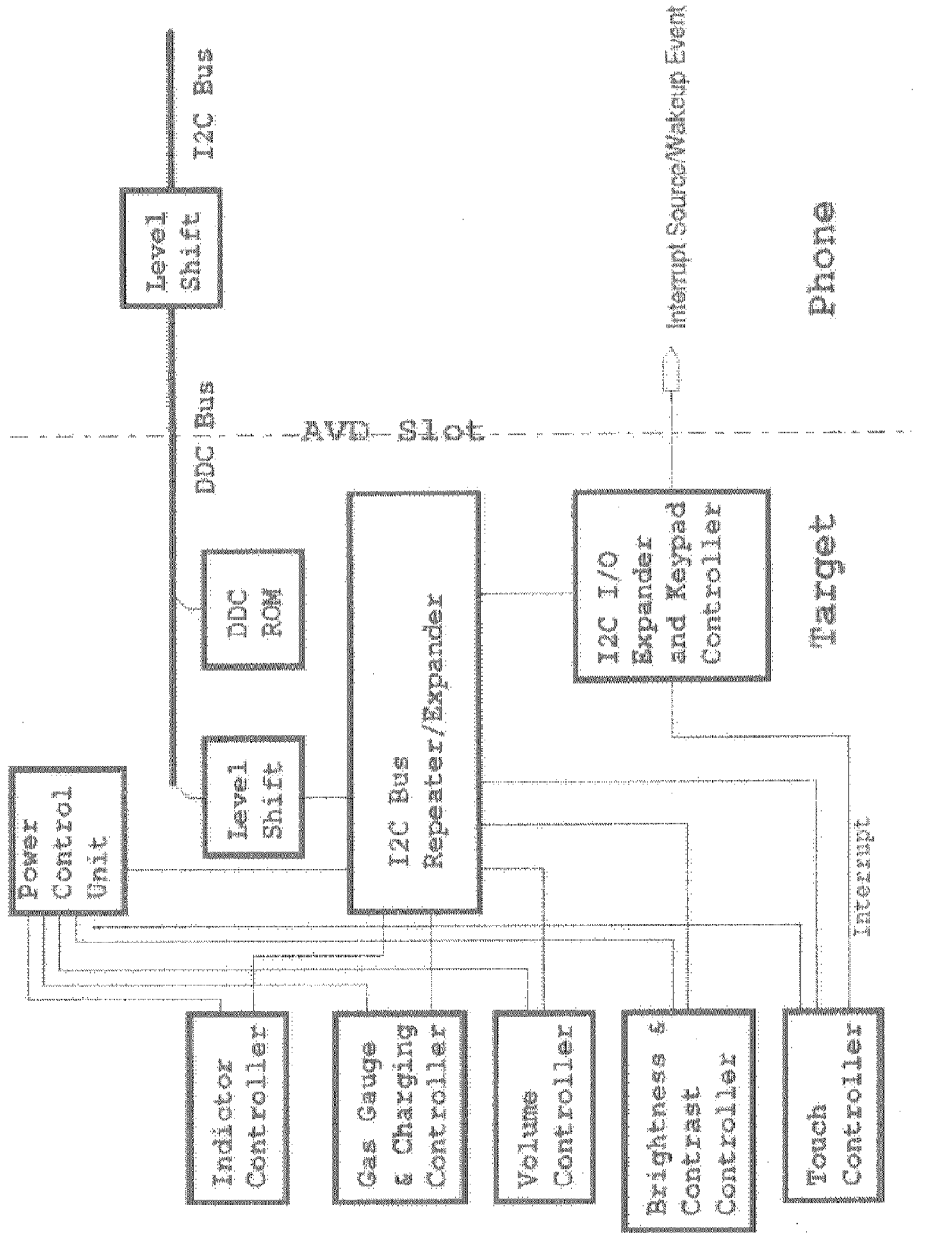
FIG. 17 illustrates control of components of a slave device via DDC in HDMI interface, in accordance with one embodiment of the present invention.

In another embodiment, referring to FIG. 16, the AVD slot in the smartphone 20 is provided with the following combination of wired interfaces: HDMI interface for display; USB interface for peripheral control, DDC interface (12C included in HDMI) for peripheral control, and analog audio interface for headset. Referring to FIG. 17, control of the target slave device (e.g., tablet device 22) may be effected by the master device (e.g. smartphone 20) using the DDC (Display Data Channel) interface found in the HDMI interface. Specifically, via the DDC interface, the touch panel, volume, brightness/contrast, power management, and other human interface devices (e.g., keyboard) in the tablet device 22 may be controlled by the smartphone 20 without any extra lead or pin. For example, via the DDC, touch panel in the tablet device 22 can be controlled with fast response time. The tablet device 22 provides "interrupt" to the smartphone 20 via the same interface.

Figure 18:
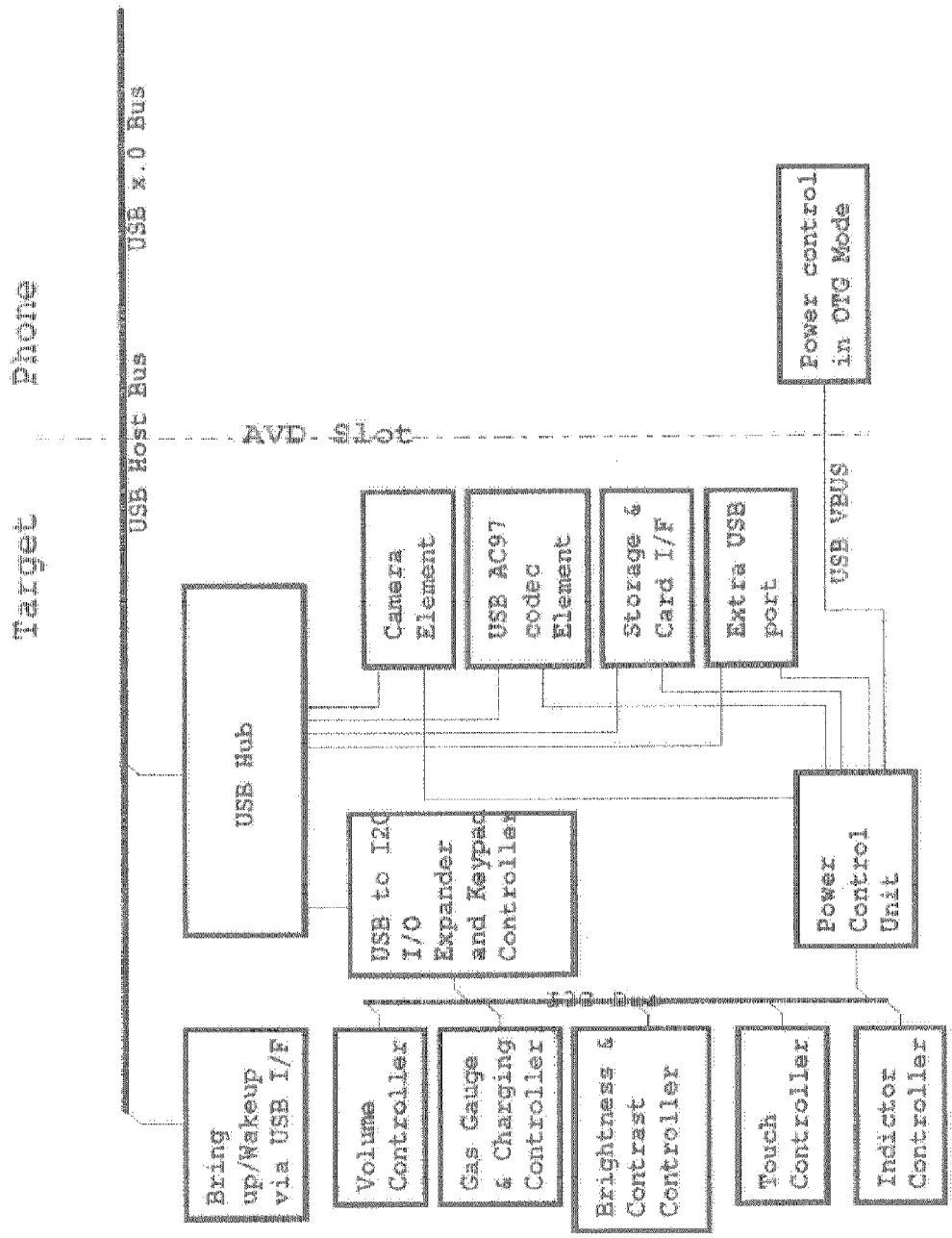
FIG. 18 illustrates control of components of a slave device via a USB interface, in accordance with one embodiment of the present invention.

FIG. 18 schematically illustrates control of the target slave tablet device 22 by the smartphone 20 via the USB interface, including power control by the tablet device 22 via the USB interface. In another aspect of the present invention, an enhanced charging and power management scheme is provided to optimize power management for the master device and the slave device. The scheme may be user programmable to dynamically allocate charging priority (which may include allocation of appropriate charging power) between the master device and slave device, based on battery charge levels in the master device and the slave device. The charging scheme may be further based on power usage by the respective master and slave devices.

According to the present invention, contrary to a normal USB interface in which a master provides power to a slave, the master device (e.g., as part of its operating software) is configured to bypass the master device providing power to the slave device, but in reverse supply power from the slave device to the master device, depending on the charging condition. Under the USB interface, normally the base host provides power to the peripheral USB device that is plugged into the host. USB has an OTG ("On-The-Go") mode, which refers to the concept that a USB device can be either a host or a peripheral, and allows for the attached USB device to switch role with the base device and become the host through the USB interface.

Figure 21:
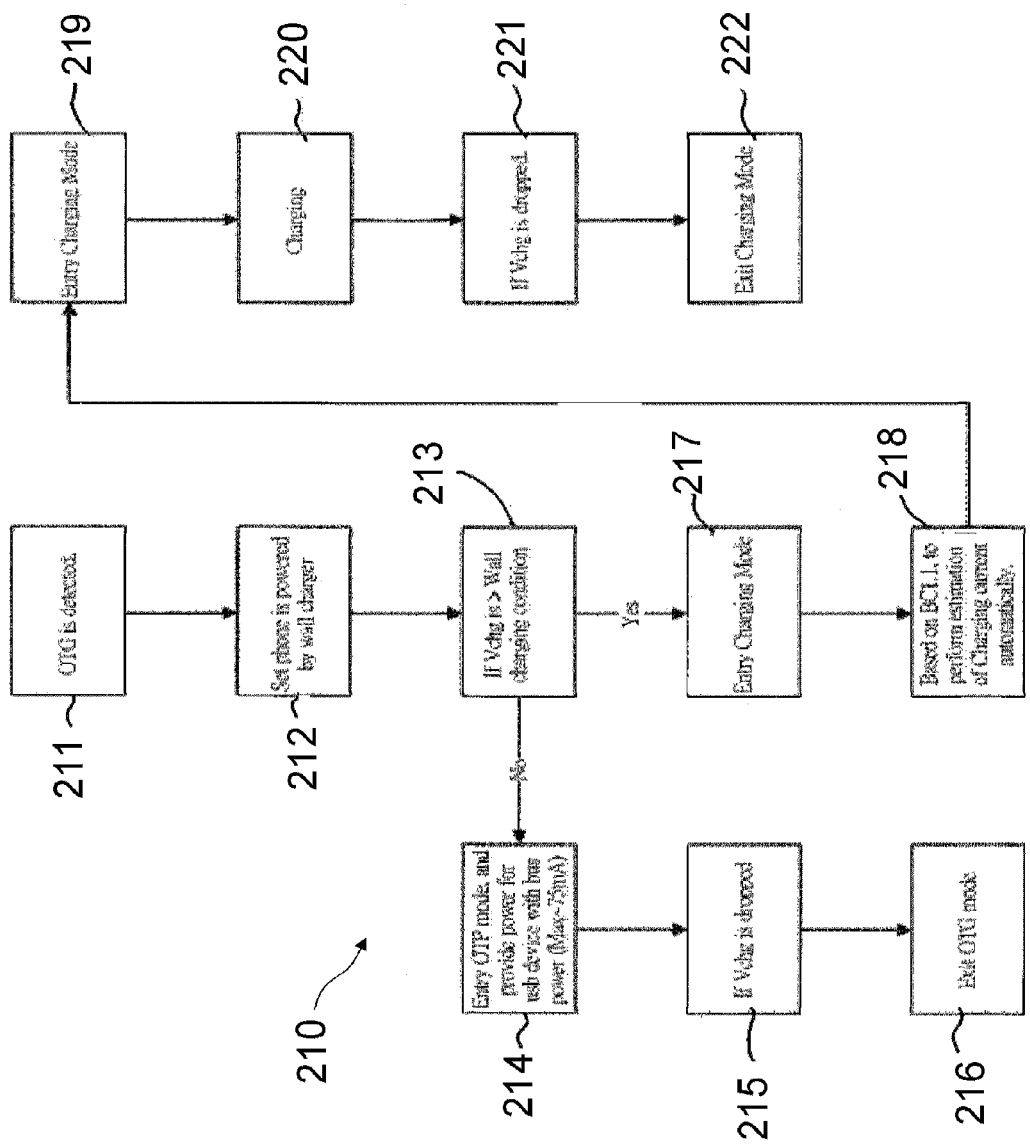
FIG. 21 is a schematic flow diagram of charging process for the master device when docked, in accordance with one embodiment of the present invention.

One embodiment of charging configuration 210 is disclosed in a schematic flow diagram in FIG. 21. In particular, once an external electronic device is electrically attached to the master device (e.g., the smartphone 20), the master device enters OTG mode (at block 211). The master device is configured to determine if such attached external electronic device is a slave device having its own rechargeable power supply (e.g., the tablet device 20) to which the master device is docked, or a peripheral USB device that does not have its own power supply (e.g., a USB flash drive).

The master device is configured by a modified USB protocol to initially enter a "set to power by external device" mode (at black 212). This is in contrast to the non-modified OTG mode, in which the master is automatically set to proved power to the attached external device. At block 213, the master device detects if there is a voltage on the VBUS path. If voltage does not exist on the VBUS path, the attached external electronic device is presumed to be a peripheral USB device that does not have its own power. At block 214, the master device charges the attached USB device. At block 215, if the USB device is detected to be disconnected from the master device, the master device exit OTG mode.

If however at block 213, voltage is detected to exist on the VBUS path, the master device determines that the attached electronic device is a slave device having its own rechargeable power supply. The slave device may be connected to an external power source via an internal or external charging adaptor. The master device enters external charging mode at block 217, with the slave device providing charging power (stored or external power) to the master device. At block 218, the charging current is also regulated based on a power management scheme (see below discussion). Charging takes place (at blocks 219 and 220) until the master device is disconnected from the slave device (at block 221), at which time the master device exits charging mode at block 222.

Further, in accordance with one embodiment of power management based on capacity and availability, the master and slave devices are charged in accordance with the following priority if the slave is provided with external power (e.g., via an A/C to D/C charge adaptor). Assume master device battery level is "X" and slave device battery level is "Y". If both X and Y <80% then charge X to 80% first and charge Y to 80% next, then trickle charge together. If X≥80% and Y<80%, divide the charge current to trickle charge X and fast charge Y. If both X and Y≥80%, then trickle charge together. If X<80%, Y≥80%, fast charge X and trickle charge Y.

While FIG. 18 shows the power management control implemented in the slave device, such function may also be implemented in the master device (e.g., the smartphone 20).

Figure 19:
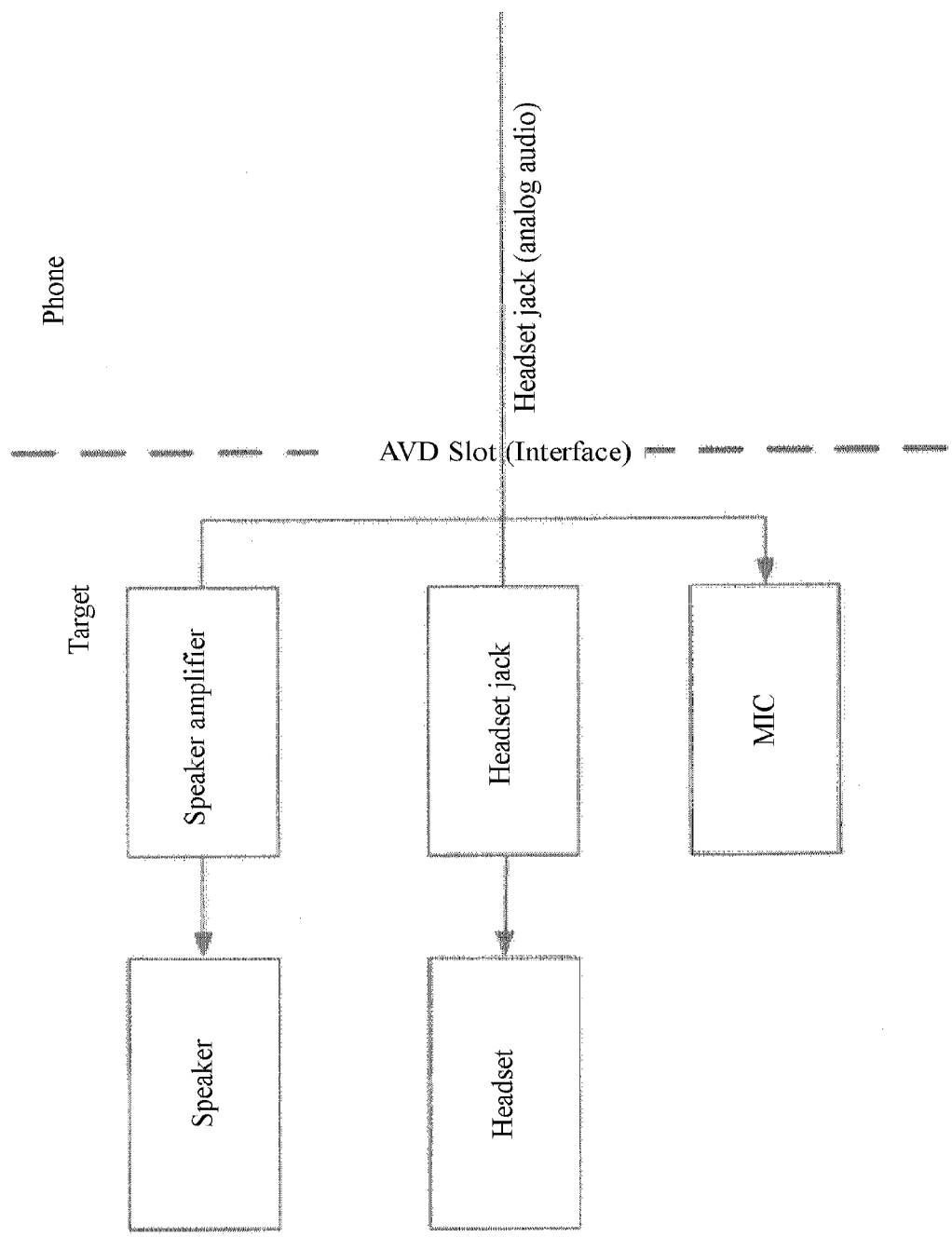
FIG. 19 illustrates control of audio I/O components in slave devices via an analog audio interface, in accordance with one embodiment of the present invention.

FIG. 19 schematically illustrates the analog audio interface controlling the speakers and amplifier, microphone and headset in the target slave tablet device 22. In one embodiment, the audio interface pin definition may include: Pin 1—Audio Right; Pin 2—MIC 1; Pin 3—Audio Left; Pin 4—MIC 2; Pin 5—Ground/Detection; Pin 6—1-wire (for docking peripheral control).

Figure 20:
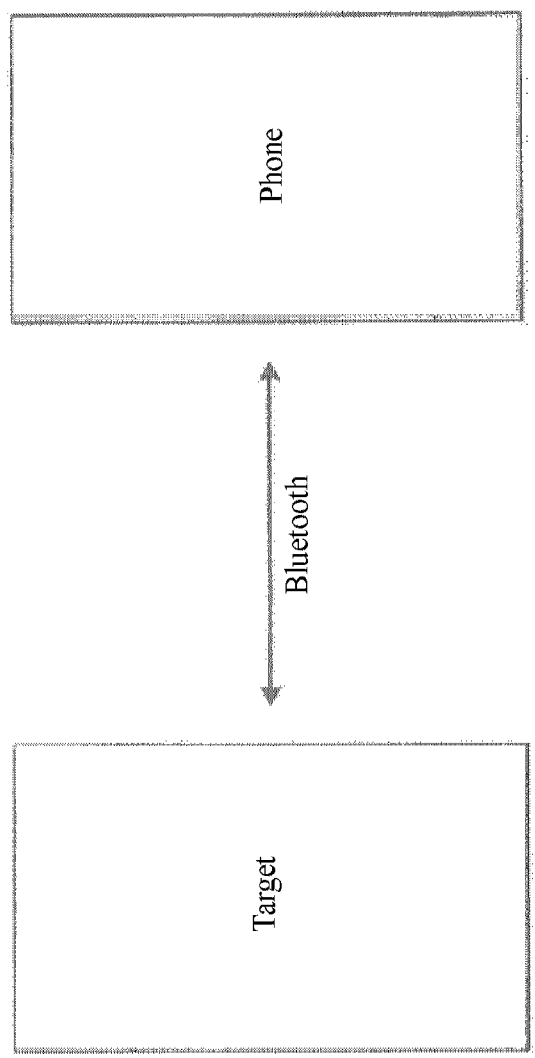
FIG. 20 illustrates control of components of a slave device via a wireless interface, in accordance with one embodiment of the present invention.

In addition, there may be a wireless interface between the master and slave devices. For example, referring to FIG. 20, the smartphone 20 may communicate with the target slave tablet device 22 via a Bluetooth interface. In one embodiment, possible Bluetooth Applications (Profiles) may include (1) HID (Human Interface Device) Profile—for input devices (e.g., keyboard); (2) HSP (Headset Profile)—for audio devices; (3) HFP (Hands-Free Profile)—for audio devices; (4) FTP (File Transfer Profile)—for storage devices.

Figure 26:
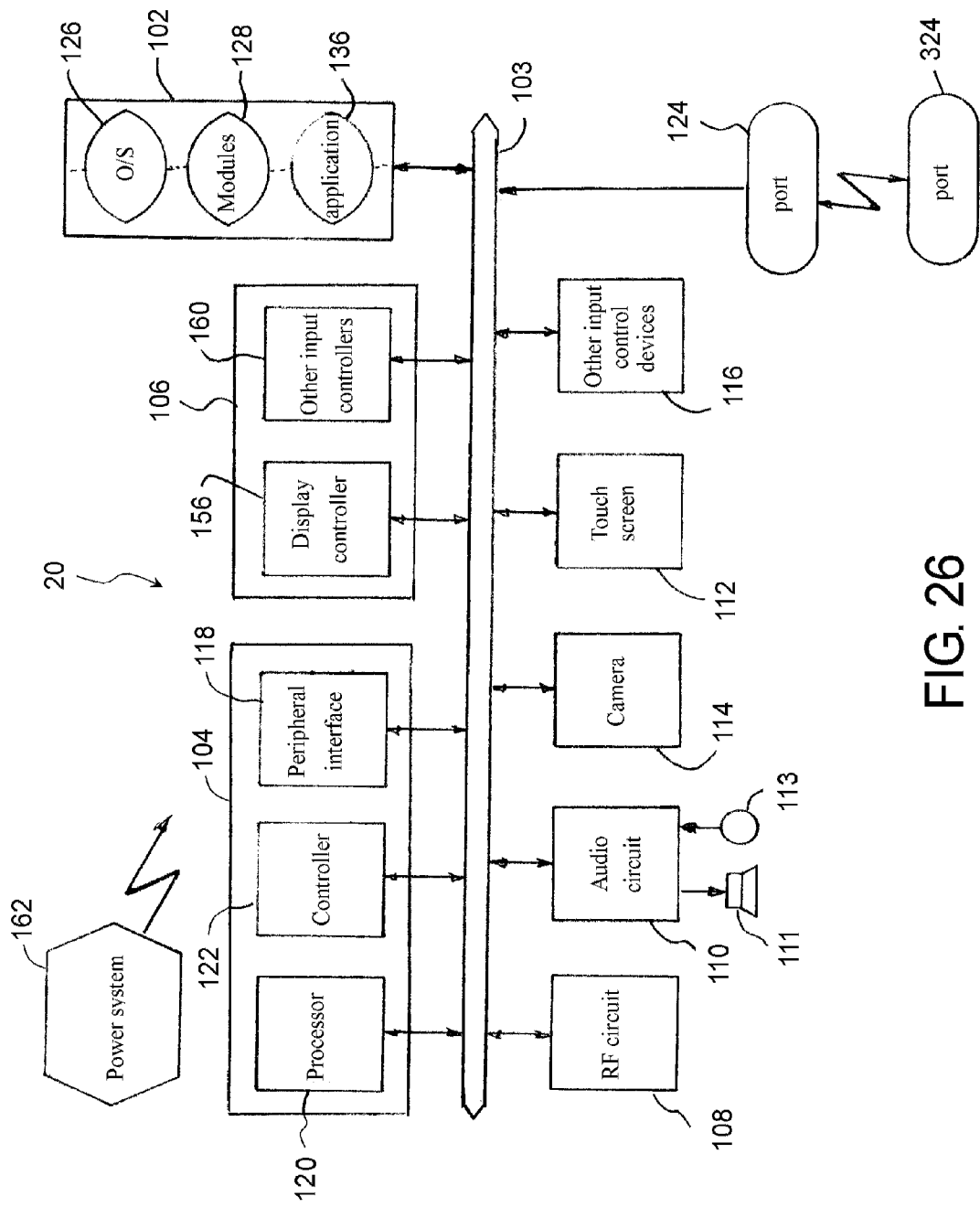
FIG. 26 is a block diagram of a master device in accordance with one embodiment of the present invention.

FIG. 26 is a block diagram schematically illustrating the components of the system of the smartphone 20 in accordance with one embodiment of the present invention, which implements the various functions, features and structures described above. The smartphone 20 include a memory 102 (e.g., one or more computer readable storage mediums, such as high-speed random access memory, and non-volatile memory), a memory controller 122 controlling access to memory 102 by other components; one or more processing units (CPU's) 120 running or executing various software programs and/or sets of instructions stored in memory 102 to perform various functions for the smartphone 20 and to process data; a peripherals interface 118 coupling the input and output peripherals of the device to the CPU 120 and memory 102; an RF circuitry 108 including an antenna/radio for receiving and sending electromagnetic signals, and communicates with communications networks (e.g., GSM and WiFi networks) and other communications devices via the electromagnetic signals based on known wireless communication protocols; an audio circuitry 110; a speaker 111; a microphone 113; a camera 114; a touch screen 112 as part of the display system of the smartphone; an input/output (I/O) subsystem 106; other input or control devices 116 (e.g., physical buttons, push buttons, rocker buttons, etc.), dials, slider switches, click wheels, etc); and an external port 124 for communicating with other devices (e.g., Universal Serial Bus (USB), docking, power charging, etc., which could be implemented in the form of the multi-pin data/electrical interface (e.g., the AVD combo slot connector described above) for coupling directly to the docking interface on the tablet 22, or indirectly via the internal data/electrical connector in the cartridge, both described above). These components may communicate over one or more communication buses or signal lines 103. In some embodiments, the peripherals interface 118, the CPU 120, and the memory controller 122 may be implemented on a single chip, such as a chip 104. In some other embodiments, they may be implemented on separate chips.

The I/O subsystem 106 couples input/output peripherals on the smartphone 20, such as the touch screen 112 and the other input/control devices 116 to the peripherals interface 118. The I/O subsystem 106 may include a display controller 156 and one or more input controllers 160 for other input or control devices. The touch-sensitive touch screen 112 provides an input interface (e.g., virtual or soft buttons, soft keyboard) and an output interface between the device and a user (e.g., displaying visual output to the user). The visual output may include graphics, text, icons, video, and any combination thereof. The touch screen 112 may use LCD (liquid crystal display) technology, or LPD (light emitting polymer display) technology.

The smartphone 20 also includes a power system 162 for powering the various components. The power system 162 may include a power management system as disclosed above, a recharging system, one or more power sources (e.g., battery, connection to external power charger, and connection to the external port 124 to receive charging power from the tablet device 22), a power failure detection circuit, a power converter or inverter, a power status indicator (e.g., a light-emitting diode (LED)) and any other components associated with the generation, management and distribution of power in portable devices.

The software components stored in memory 102 include an operating system 126 (e.g., Android, WINDOWS, or an embedded operating system) and various modules 128 including software components and/or drivers for controlling and managing general system tasks (e.g., memory management, storage device control, power management, etc.) and facilitates communication between various hardware and software components. The memory 102 may store, for example, a communication module that facilitates communication with other devices over one or more external ports 124 and also includes various software components for handling data received by the RF circuitry 108 and/or the external port 124; a contact/motion module for detecting and/or reading user touch/motion input; a graphics module for rendering and displaying graphics on the touch screen 112. In addition, memory 102 may include various application modules 136, such as a contacts module (sometimes called an address book or contact list); a telephone module; an e-mail client module; an instant messaging (IM) module; a camera module for still and/or video images; a music player module; a browser module; a calendar module; etc.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module may be combined with music player module into a single module. In some embodiments, memory 102 may store a subset of the modules and data structures identified above.

Furthermore, memory 102 may store additional modules and data structures not described above.

It should be appreciated that the smartphone 20 as illustrated is only one example of a master device, and that the device may have more or fewer components than shown, may combine two or more components, or may have a different configuration or arrangement of the components. The various components shown in FIG. 26 may be implemented in hardware, software or a combination of hardware and software, including one or more signal processing and/or application specific integrated circuits.

Figure 27:
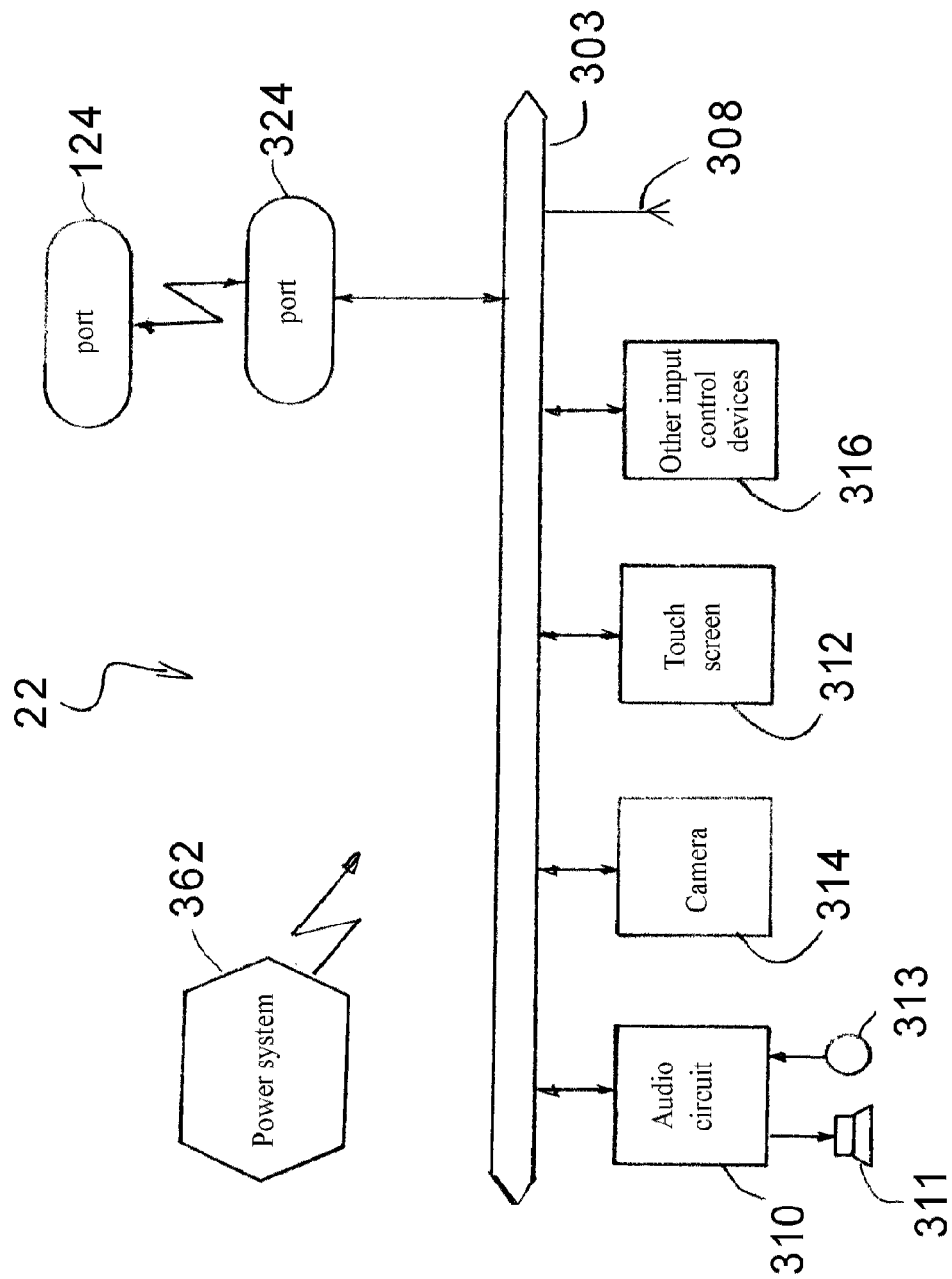
FIG. 27 is a block diagram of a slave device in accordance with one embodiment of the present invention.

FIG. 27 is a block diagram of the tablet device 22 in accordance with one embodiment of the present invention. Given that the tablet device 22 is a "dumb" terminal, subject to control of the smartphone 20, and uses the applications stored in the smartphone 20, the tablet device 22 has a relatively simpler set of passive components, as compared to the smartphone 20. The tablet 22 may include an external port 324 for communicating with other devices (e.g., Universal Serial Bus (USB), docking, charging port, etc., which could be implemented in the form of a multi-pin docking interface for coupling directly to the data/electrical interface on the smartphone 20 (e.g., the AVD combo slot connector described above) or indirectly via the external data/electrical connector on the cartridge, as described above); an audio circuitry 310; a speaker 311; a microphone 313; a camera 314; a touch screen 312 as part of the display system of the tablet device 22; other input or control devices 316 (physical buttons (e.g., push buttons, rocker buttons, etc.), dials, slider switches, click wheels, etc). These components may communicate over one or more communication buses or signal lines 303 with the external port 324. In addition, if enhanced wireless connection is desired, an enhanced antenna 308 may be provided for communicating with communications networks.

The visual output may include graphics, text, icons, video, and any combination thereof. The touch screen 312 may use LCD (liquid crystal display) technology, or LPD (light emitting polymer display) technology. The various input/output peripherals on the tablet device 22, such as the touch screen 312 and the other input/control devices 116, are controlled by the I/O subsystem 106 in the smartphone 20 when the smartphone 20 is docked to the tablet device 22 (i.e., the external port 124 on the smartphone 124 and the external port 324 on the table device 22 are operatively coupled, either directly or indirectly via the data/electrical connectors in the cartridge, as discuss above). The peripherals such as audio circuitry 310, speaker 311, microphone 313, and camera 314 are controlled via the peripheral interface 118 in the smartphone 20, via the external ports 124 and 324 when the smartphone 20 is docked to the tablet device 22. A sub-controller (not shown) may be provided in the tablet device 22, which acts as a slave controlled by the controller 122 and/or processor 120 and/or the I/O subsystem 106 in the master smartphone 20. The sub-controller controls the operations of the various peripherals and/or I/O devices in the tablet device 22, based on control signals received from the smartphone 20.

The tablet device 22 also includes a power system 362 for powering the various components. The power system 362 includes, a recharging system, one or more power sources (e.g., battery, connection for external power charger), a power failure detection circuit, a power converter or inverter, a power status indicator (e.g., a light-emitting diode (LED)) and any other components associated with the generation and distribution of power in portable devices. The power system 362 is operatively coupled to the power system 162 in the smartphone 20, and supplies charging power to the smartphone 20 via the external ports 124 and 324. The power system 362 may rely on the power management system of the power system 162 in the smartphone 20, or include its own power management system that complements and/or coordinates with the power management system in the smartphone 20.

It should be appreciated that the tablet device 22 as illustrated is only one example of a slave device, and that the device may have more or fewer components than shown, may combine two or more components, or may have a different configuration or arrangement of the components.

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

The invention claimed is:

1. A modular system of devices, comprising:
a first electronic device that is independently functional with its own set of features, comprising a first housing in a first form factor, supporting:
a first human input/output interface;
a control system comprising a system processor and an operating system, controlling operation of the first human input/output interface;
a first power source providing power to operate the first electronic device;
an electrical interface providing data access external of the housing; and
a second electronic device comprising a second housing in a second form factor, supporting:
a second human input/output interface;
a second power source providing power to operate the second electronic device;
a docking interface communicating with the electrical interface of the first electronic device,
wherein the first electronic device is removably dockable to the second electronic device, and wherein operation of the second electronic device is controlled at least in part by the system processor of the first electronic device via the electrical interface and docking interface when the first electronic device is docked to the second electronic device.

2. The modular system as in claim 1, wherein the control system further comprises a memory in the first electronic device storing the operating system, application programs and data, which are relied by the second electronic device for operations.

3. The modular system as in claim 2, wherein the operation of the second electronic device is also controlled by the operating system of the first electronic device.

4. The modular system as in claim 3, wherein the operating system in the first electronic device provides more functionality than any limited device specific operation routine provided in the second electronic device.

5. The modular system as in claim 3, wherein the system processor in the first electronic device provides a higher processing power that any processor provided in the second electronic device.

6. The modular system as in claim 3, wherein the system processor comprises a central processor unit (CPU), which provides higher processing power than any processor provided in the second electronic device, including any CPU provided in the second electronic device.

7. The modular system as in claim 1, further comprising an intermediate, portable, removable physical interface adaptor that facilitates docking of the first electronic device to the second electronic device and provides data and power connection between the electrical interface and a docking bay provided in the second housing of the second electronic device.

8. The modular system as in claim 7, wherein the portable physical interface adaptor conforms to the first form factor of the first electronic device and conforms to the docking bay provided in the second housing, such that the first electronic device can be docked into the second housing of the second electronic device.

9. The modular system as in claim 8, wherein the physical interface adaptor comprises a first structure that conforms to at least a part of the first housing, and a second structure that conforms to the docking bay in the second housing, such that said at least a part of the first housing can fit into the first structure and the second structure can fit into the docking bay in the second housing, so that the first electronic device can be docked to the housing of the second electronic device.

10. The modular system as in claim 9, wherein the first electronic device is substantially contained in the second electronic device upon docking.

11. The modular system as in claim 7, wherein the physical interface adaptor supports an electrical adaptor having a first end connectable to the electrical interface on the first electronic device, and a second end connectable to the docking interface on the second electronic device.

12. The modular system as in claim 11, wherein the physical interface adaptor further comprises an adaptor bar removably coupled to the frame, wherein the adaptor bar supports the electrical adaptor.

13. The modular system as in claim 8, wherein the physical interface adaptor is configured as a cartridge.

14. The modular system as in claim 9, wherein the first structure is a frame supporting the first electronic device.

15. The modular system as in claim 14, wherein the second structure is a cartridge receiving the frame.

16. The modular system as in claim 1, wherein the electrical interface comprises a combination of HDMI and USB.

17. The modular system as in claim 1, wherein a third electronic device having a third form factor different from the first form factor may be dockable to the second electronic device using another portable physical interface adaptor associated with the third electronic device, which conforms to the third form factor and conforms to the docking bay.

18. The modular system as in claim 1, wherein the first power source comprises a first battery, and the second power source comprises a second battery, wherein when the first electronic device is docked to the second electronic device and both first and second electronic devices are being charged by an external power source, charging priority is dynamically allocated between the first and second electronic devices, based on battery charge levels in the respective first and second electronic devices.

19. The modular system as in claim 18, wherein charging priority is dynamically allocated in accordance with current battery charge level X of the first battery and current battery charge level Y of the second battery in reference to a battery charge level threshold P %, wherein:

if X<P %, Y<P %, first charging X to P % and then charging Y to P %, or if X≥P % Y<P %, divide charging current into trickle charging X and fast charging Y to P %, or if X<P %, Y≥P %, divide charging current into fast charging X to P % and trickle charging Y, or if X≥P %, Y≥P %, trickle charging X and Y.

20. The modular system as in claim 18, wherein charging priority is dynamically allocated further based on power usage by the respective first and second electronic devices.

21. The modular system as in claim 1, wherein the control system of the first electronic device is configured to determine docking status, and wherein upon confirming docking of the first electronic device to the second electronic device, the first electronic device automatically switches control of the operation of the second electronic device.

22. The modular system as in claim 21, wherein the second human input/output interface of the second electronic device includes a display, and wherein the control system switches to controlling the display based on its associated display characteristics upon confirmation of docking of the first electronic device to the second electronic device.

23. A docking adaptor to facilitate docking a first electronic device having a first housing having a first form factor, to a docking bay in a second housing of a second electronic device having a second form factor, comprising:

a first structure that conforms to at least a part of the first housing;

a second structure that conforms to the docking cavity in the second housing, such that said at least a part of the first housing can fit into the first structure and the second structure can fit into the docking bay in the second housing, so that the first electronic device can be docked into the housing of the second electronic device; and an adaptor interface having a first end connectable to an electrical interface on the first electronic device, and a second end connectable to a docking interface at the docking bay in the second electronic device.

24. A first electronic device comprising:

a housing having a form factor, supporting:

a human input/output interface;

a power source providing power to operate the first electronic device;

a docking interface structured to communicate with an electrical interface of a second electronic device having a larger form factor than the form factor of the housing, wherein the first electronic device is removably dockable to the second electronic device, and wherein operation of the second electronic device is controlled at least in part by a system processor of the first device via the docking interface when the first electronic device is docked to the second electronic device.

* * * * *